(12) United States Patent
Matsumoto

(10) Patent No.: US 6,657,699 B2
(45) Date of Patent: Dec. 2, 2003

(54) LIQUID CRYSTAL DISPLAY UNIT HAVING PIXEL ELECTRODE ENCIRCLED WITH PARTITION WALL AND PROCESS FOR FABRICATION THEREOF

(75) Inventor: Kimikazu Matsumoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 155 days.

(21) Appl. No.: 09/901,034

(22) Filed: Jul. 10, 2001

(65) Prior Publication Data
US 2002/0008829 A1 Jan. 24, 2002

(30) Foreign Application Priority Data
Jul. 11, 2000 (JP) ........................................ 2000-209706

(51) Int. Cl.[7] ............................................. G02F 1/1345
(52) U.S. Cl. ........................................ 349/156; 349/141
(58) Field of Search ................................. 349/141, 156, 349/97, 106

(56) References Cited

U.S. PATENT DOCUMENTS 6,133,977 A * 10/2000 Lee et al. .................... 349/141
6,147,729 A * 11/2000 Kurauchi et al. ............ 349/106
6,411,360 B1 * 6/2002 Matsuyama et al. ........ 349/156

* cited by examiner

*Primary Examiner*—Robert H. Kim
(74) *Attorney, Agent, or Firm*—McGinn & Gibb, PLLC

(57) ABSTRACT

An in-plane switching type liquid crystal display unit has a matrix of pixels for producing images thereon, and each of the pixels includes a pixel electrode and a thin film transistor connected to the pixel electrode both formed in a first substrate structure, a part of a second substrate structure spaced from the first substrate structure and a piece of liquid crystal filling the gap therebetween, wherein a partition wall is formed for encircling part of said piece of liquid crystal so as to block the piece of liquid crystal from elastic influence of the remaining liquid crystal, thereby improving the response time and the threshold of the pixel.

22 Claims, 23 Drawing Sheets

LIQUID CRYSTAL DISPLAY UNIT HAVING PIXEL ELECTRODE ENCIRCLED WITH PARTITION WALL AND PROCESS FOR FABRICATION THEREOF

FIELD OF THE INVENTION

This invention relates to a liquid crystal display unit and, more particularly, to a an in-plane switching type liquid crystal display unit and a process for fabricating the in-plane switching type liquid crystal display unit.

DESCRIPTION OF THE RELATED ART

An active matrix liquid crystal display unit has an image producing plane, which is implemented by a matrix of pixels. The pixels are respectively associated with thin film transistors, and the pixel electrodes are selectively connected to data lines through the associated thin film transistors. Image carrying signals are supplied to the selected pixel electrodes, and change the transparency of the liquid crystal at the selected pixels by changing the electric field between the selected pixel electrodes and the common electrode. Thus, the transparency of liquid crystal is precisely controlled, and a high-quality image is produced on the matrix of the pixels.

The transparency of liquid crystal is varied by changing the directors of the liquid crystal molecules. When the liquid crystal display unit has the twisted nematic liquid crystal, the directors of the liquid crystal molecules are rotated toward a direction normal to the image producing surface. On the other hand, if the directors of the liquid crystal molecules is twisted to a direction parallel to the image producing surface, the liquid crystal display unit is categorized in the in-plane switching type.

The in-plane switching type liquid crystal display unit has two substrate structures, and the liquid crystal is confined between the two substrate structures. The thin film transistors are fabricated on the first transparent substrate, and the pixel electrodes and the common electrodes are further formed on the first transparent substrate. The pixel electrodes have a comb-like shape, and the common electrodes also have a comb-like shape. The pixel electrodes and the common electrodes are arranged on the first transparent substrate such that the common electrodes are interdigitated with the pixel electrodes. Potential difference is applied between the pixel electrodes and the common electrodes, and creates electric fields between the pixel electrodes and the common electrodes in parallel to the first transparent substrate. The electric fields give rise to change of the directors of the liquid crystal molecules, and the transparency is varied. The directors are rotated on the planes parallel to the first transparent substrate. The in-plane switching type liquid crystal display unit is more attractive than the twisted nematic type liquid crystal display unit, because the relation between the amount of transmitted light and the applied potential difference is not widely varied in the range from the direction of the directors and the normal line to the first transparent substrate. For this reason, the in-plane switching type liquid crystal display unit produces fine images in the wide angle of view.

The liquid crystal in the in-plane switching type liquid crystal display unit has a homozygous orientation. The liquid crystal is sandwiched between two polarizing plates. The polarizing plates have respective planes of polarization which are perpendicular to each other. One of the polarizing plates has the direction in parallel to the orientation. When the potential difference is removed from between the pixel electrodes and the common electrodes, the light is interrupted by the liquid crystal, and the image producing surface becomes black. The luminance is low and stable. A potential difference is applied between a pixel electrode and the associated common electrode. The liquid crystal molecules are rotated in the direction of the electric field, and permit the light to pass therethrough. For this reason, the pixel becomes white.

FIGS. 1 and 2 show a prior art liquid crystal display unit. The prior art liquid crystal display unit is broken down into a lower substrate structure, an upper substrate structure and liquid crystal confined between the lower substrate structure and the upper substrate structure. Thin film transistors are incorporated in the lower substrate structure, and color filters are formed in the upper substrate structure.

The lower substrate structure is fabricated on the basis of a transparent substrate 1. Gate electrodes 2 and a common electrode 3 are formed on the transparent substrate 1, and are covered with an inter-layered insulating layer 4. Data lines 6 and a pixel electrode 7 are patterned on the inter-layered insulating layer 4, and are covered with a passivation layer 8. The gate electrodes 2 extend perpendicular to the data lines 6, and thin film transistors 5 are assigned to regions where the gate electrodes 2 cross the data lines 6. The pixel electrode 7 is offset from the common electrode 3, and is in parallel to the common electrode 3. An orientation layer 18 is formed on the passivation layer 8, and a polarizing plate 16a is attached to the lower surface of the transparent substrate 1. The data lines 6 and the pixel electrode 7 are hatched in FIG. 1 for discriminating them from other electrodes.

On the other hand, the upper substrate structure has a transparent substrate 11, and a black matrix 12 and colored layer 13 are formed on the lower surface of the transparent substrate 11. The colored layers 13 serve as color filters. The black matrix 12 and the colored layers 13 are covered with a flattening layer 14, and an orientation layer 18 is formed on the lower surface of the flattening layer 14. The upper surface of the transparent substrate 11 is covered with a conductive layer 15, and a polarizing plate 16b is attached to the upper surface of the conductive layer 15.

The upper substrate structure is spaced from the lower substrate structure in such a manner that the orientation layers 18 are opposed to each other, and the liquid crystal 17 fills the gap between the orientation layers 18. The orientation layers 18 was subjected to a rubbing at a certain angle with respect to the longitudinal direction of the pixel electrode 7, and the liquid crystal 17 has homogenous orientation in a direction indicated by arrow A1.

The polarizing plate 16a has a plane of polarization which is perpendicular to a plane of polarization of the other polarization plate 16b. One of the planes of polarization is in parallel to the orientation of the liquid crystal molecules 17. The pixel electrode 7, the color filter 13 and part of the liquid crystal 17 therebetween form a part of the pixel. The transparency of the part of the liquid crystal over the pixel electrode 7 is changed as follows. First, the gate electrode 2 is changed to the active level, and the associated data line 6 is driven to a certain potential level. The thin film transistor 5 turns on, and the certain potential level reaches the pixel electrode 7. A lateral electric field is created between the pixel electrode 7 and the common electrode 3, and the liquid crystal molecules 17 are rotated in the planes parallel to the lower substrate structure. As a result, the transparency of the liquid crystal over the pixel electrode 7 is changed.

A problem is encountered in the prior art in-plane switching type liquid crystal display unit in that the pixels do not promptly respond to the potential level applied to the associated pixel electrodes 7. Another problem is unintentionally colored pixels on the image producing surface.

SUMMARY OF THE INVENTION

It is therefore an important object of the present invention to provide a liquid crystal display unit, which is promptly responsive to image-carrying signals for producing a picture without any unintentionally colored pixel.

It is also an important object of the present invention to provide a process for fabricating the liquid crystal display unit.

In accordance with one aspect of the present invention, there is provided an in-plane switching type liquid crystal display panel for producing images comprising a pair of substrate structures opposed to each other for creating a gap therebetween, and liquid crystal filling the gap, and serving as optical elements of plural pixels where the images are produced, each of the plural pixels includes a common electrode formed in one of the substrate structures of the pair, a pixel electrode formed in the aforesaid one of the substrate structures in an offset manner to the common electrode, and defining a zone in the liquid crystal together with the common electrode for accommodating one of the optical elements of the plural pixels therein and a switching transistor formed in the aforesaid one of the substrate structures and having a source connected to the pixel electrode, a data line extending outside of a periphery of the zone and a gate electrode extending outside of the periphery, and the in-plane switching type liquid crystal display unit further comprises at least one partition wall structure associated with the aforesaid each of the plural pixels, formed in any one of the substrate structures and projecting into the zone for separating at least part of the aforesaid one of the optical elements from the remaining liquid crystal.

In accordance with another aspect of the present invention, there is provided a process for fabricating an in-plane switching type liquid crystal display unit comprising the steps of a) preparing substrate structures one of which includes at least one partition wall structure occupying an area partially overlapped with a pixel electrode forming a part of one of plural pixels and a common electrode associated with the pixel electrode, a switching transistor connected with the pixel electrode, a data line connected to the switching transistor being located out of the area, b) assembling the substrate structures in such a manner as to form a gap therebetween and c) introducing liquid crystal into the gap so that part of the liquid crystal fills a zone defined by a periphery of the at least one partition wall structure.

BRIEF DESCRIPTION OF THE DRAWINGS

The features and advantages of the liquid crystal display unit and the process will be more clearly understood from the following description taken in conjunction with the accompanying drawings in which.

ANALYSIS ON LIQUID CRYSTAL

The present inventor contemplated the problems inherent in the prior art in-plane switching type liquid crystal display unit. The present inventor analyzed the motion of liquid crystal molecules, and found out the origins of the problems.

The origins of the problems are derived from unintentional electric fields created between the gate electrode 2 and the common electrode 3 and between the data line 6 and the common electrode 3. These unintentional electric fields influence the liquid crystal molecules 17, and make the liquid crystal molecules fluctuate.

Figure 3:
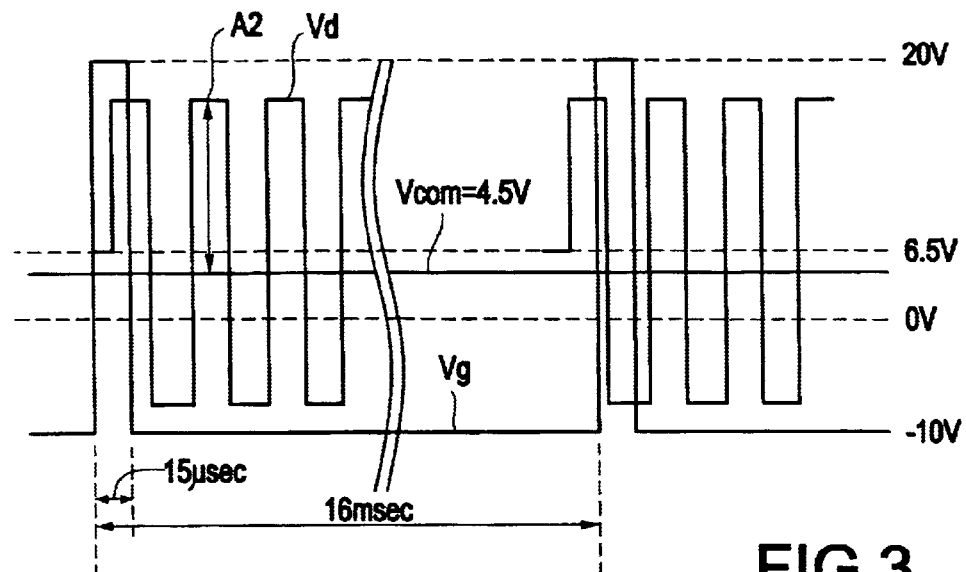
FIG. 3 is a timing chart showing the potential levels on the gate electrode, data line and common electrode of the prior art in-plane switching type liquid crystal display unit.

In detail, a constant potential level Vcom is applied to the common electrode 3 (see FIG. 3), and is 4.5 volts. An image-carrying signal Vd is propagated through the data line 6, and is supplied through the associated thin film transistor 5 to the pixel electrode 7. Arrow A2 is indicative of the potential difference applied between the pixel electrode 7 and the common electrode 3. The potential difference between pixel electrode 7 and the common electrode 3 gives rise to the rotation of the liquid crystal molecules 17. Thus, the common electrode 3 is under the influence of the potential level of the pixel electrode 7. However, the data line 6 is biased with a direct current voltage of 6.5 volts at all times. This means that the potential difference of the order of 2.0 volts is applied between the non-selected data line 6 and the common electrode 3 at all times. The gate electrode 2 is applied with a gate signal Vg, which is changed from −10 volts to +20 volts. For this reason, the common electrode 3 is under the influence of the potential levels of the data line 6 and the gate electrode 2.

The distance L2 between the pixel electrode 7 and the common electrode 3 ranges from 5 microns to 10 microns. However, the distance L1 between the data line 6 and the common electrode 3 is of the order of 2 microns. This is because of the fact that the common electrode 3 is arranged to be close to the data line 6. The zone over between the data line 6 and the common electrode 3 is shielded with the black matrix 12 (see FIG. 2), and does not participate the image production. On the other hand, the zone between the pixel electrode 7 and the common electrode 3 has strong influence on the aperture ratio. For this reason, it is desirable to arrange the common electrode 3 as close to the data line 6 as possible. The electric field is proportional to the potential difference, and is inversely proportional to the distance between the electrodes. Although the potential difference between the common electrode 3 and the pixel electrode 7 is of the order of 2 volts, the distance between the data line 6 and the common electrode 3 is narrow. For this reason, a strong electric field is created between the data electrode 6 and the common electrode 3.

Figure 4:
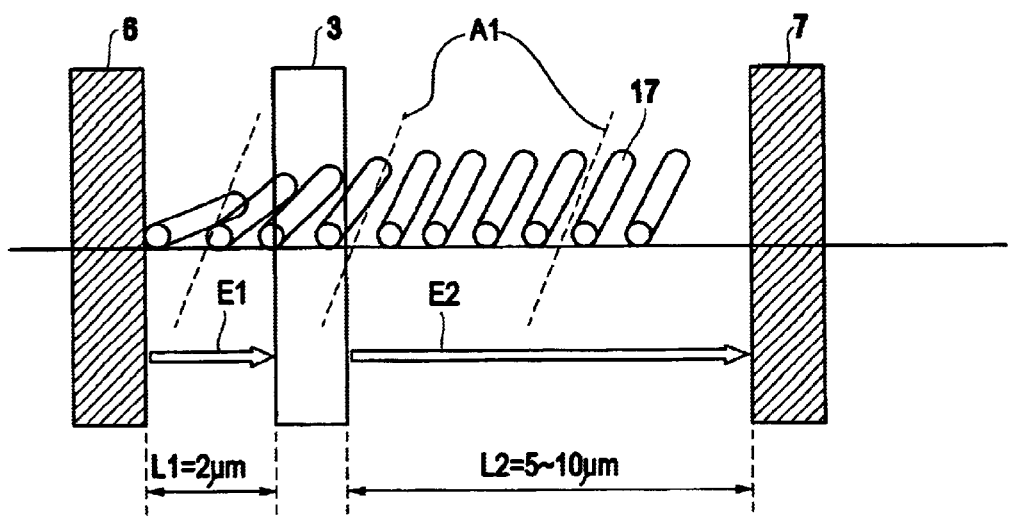
FIG. 4 is a schematic view showing the liquid crystal molecules around the data line when the pixel is made white.

FIG. 4 shows the liquid crystal molecules 17 between the data line 6 and the pixel electrode 7. The liquid crystal molecules 17 between the data line 6 and the common electrode 3 are rotated in a direction apart from the initial orientation A1 due to the strong electric field E1. On the other hand, the liquid crystal molecules 17 between the common electrode 3 and the pixel electrode 7 are within the pixel, and are rotated in the direction of the electric field E2 between the common electrode 3 and the pixel electrode 7 so as to make the pixel white. When the potential difference is removed from between the common electrode 3 and the pixel electrode 7, the liquid crystal molecules 17 return to the initial orientation, and make the pixel black. This means that the liquid crystal molecules 17 between the data line 6 and the common electrode 3 are oriented differently from the liquid crystal molecules 17 between the common electrode 3 and the pixel electrode 7.

In general, the liquid crystal molecules are not independently rotated in the presence of electric field. A liquid crystal molecule influences the adjacent liquid crystal molecules. The influence is due to the elasticity of liquid crystal. The rotation of a liquid crystal molecule gives rise to rotation of adjacent liquid crystal molecules, and, accordingly, the cluster of liquid crystal molecules is twisted. Elastic coefficients K11, K22 and K33 are given between the stresses and the strains for the stretching, twisting and bending. When a potential difference is applied to or removed from the electrodes, the cluster of liquid crystal molecules is deformed depending upon the elastic force exerted thereon.

From the viewpoint of the elastic deformation, the direct current voltage between the data line 6 and the common electrode 3 gives rise to the creation of the electric field E1, and the liquid crystal molecules 17 is forced to be oriented in the direction of the electric field. For this reason, the liquid crystal molecules 17 between the data line 6 and the common electrode 3 are constantly oriented. However, the liquid crystal molecules 17 between the common electrode 3 and the pixel electrode 7 are bidirectionally rotated in the electric field E2 created due to the potential difference between the common electrode 3 and the pixel electrode 7. When the potential difference is applied between the common electrode 3 and the pixel electrode 7, the liquid crystal molecules 17 are rotated in the clockwise direction in FIG. 4, and makes the pixel white. On the other hand, if the potential difference is removed, the liquid crystal molecules 17 are rotated in the counter clockwise direction, and makes the pixel black. The liquid crystal molecules 17 between the data line 6 and the common electrode 3 exhibit the resistance against the rotation due to the elasticity. The resistance is serious when the potential difference is removed, and the pixel is slowly changed to the black.

The electric field between the common electrode 3 and the gate electrode 2 also influences the rotation of the liquid crystal molecules. The data line 6 is spaced from the common electrode 3 by 8 microns (see FIG. 5). Although the distance L3 is wider than that L1 between the data line 6 and the common electrode 3, the potential difference is of the order of 15 volts at the low level on the gate electrode 2. This results in a strong electric field.

Figure 5:
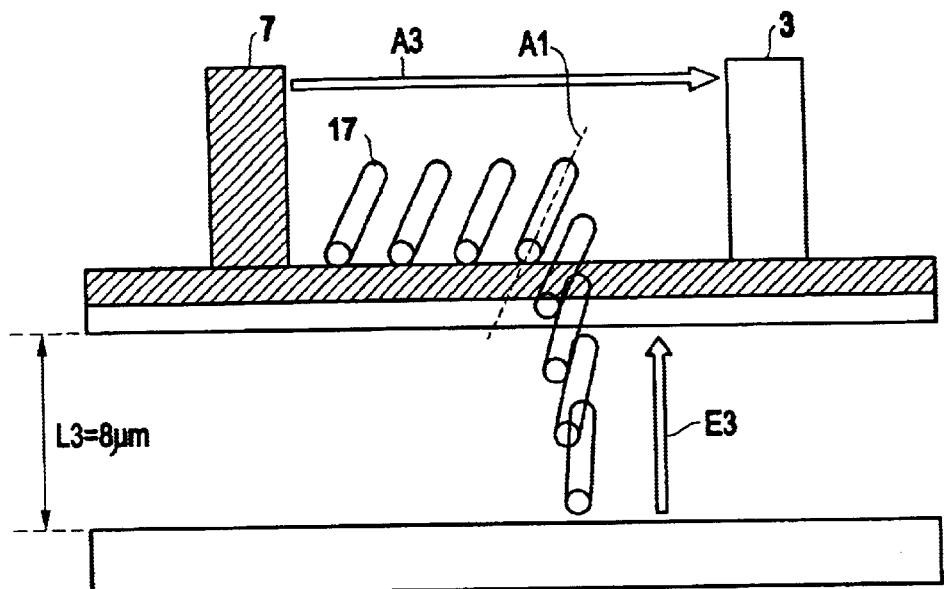
FIG. 5 is a schematic view showing the liquid crystal molecules around the data line when the pixel is made white.
Figure 6:
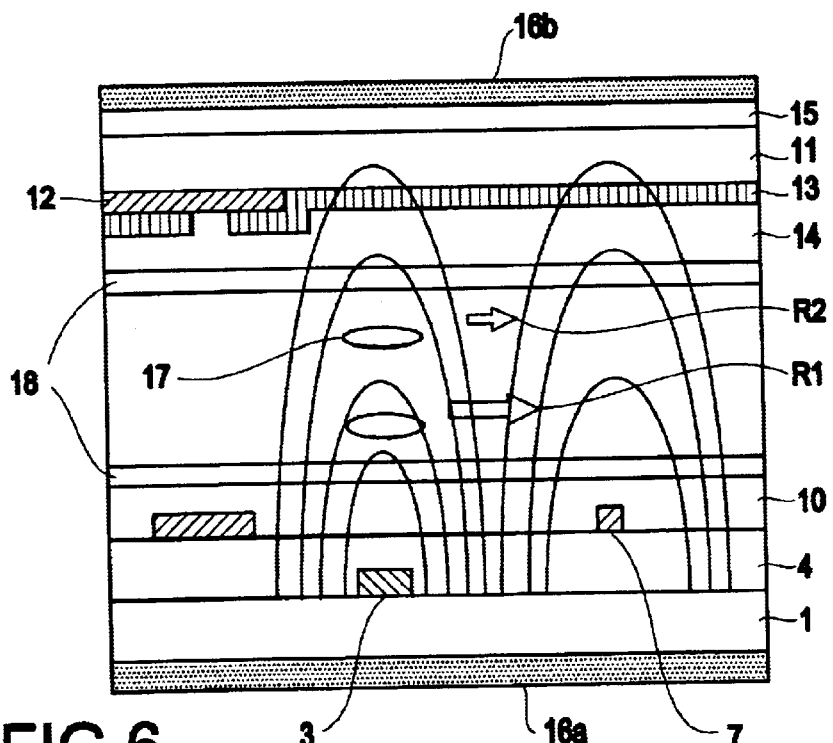
FIG. 6 is a schematic view showing the electric field created in the pixel.

As shown in FIG. 5, the liquid crystal molecules around the common electrode 3 are forced to be oriented in the direction of the electric field E3 at all times. The liquid crystal molecules 17 in the pixel are rotated at the application of the potential difference and at the removal of the potential difference. Whenever the liquid crystal molecules 17 are rotated over the orientation of the liquid crystal molecules 17 in the vicinity of the common electrode 3, the liquid crystal molecules 17 in the vicinity of the common electrode 3 exhibit the resistance against the rotation of the liquid crystal molecules 17 due to the elasticity of liquid crystal. The elastic resistance is causative of the slow response to the image-carrying signals.

The elastic resistance is against the rotation of liquid crystal molecules 17, and the electric field between the pixel electrode 7 and the common electrode 3 gives rise to the rotation of the liquid crystal molecules 17. When the electric field is strong, the force exerted on the liquid crystal molecules 17 is much larger than the elastic resistance, and the liquid crystal molecules 17 are quickly rotated. However, if the electric field is weak, the elastic resistance is serious to the liquid crystal molecules 17, and the liquid crystal molecules 17 are slowly rotated in the weak electric field. In the prior art in-plane switching liquid crystal display unit, the electric field due to the potential difference between the pixel electrode 7 and common electrode 3 is weakened together with the distance form the lower substrate structure. The electric field in region R1 is fairly strong. However, the electric field in region weaker than the electric field in region R1. For this reason, the liquid crystal molecules closer to the upper substrate structure are rotated slower than the liquid crystal molecules close to the lower substrate structure are. The threshold voltage of the liquid crystal becomes high. As a result, the transparency is lowered in regions applied with the low voltage. The liquid crystal molecules under the influence of the electric field due to the potential differences between the common electrode 3 and the data/gate electrodes 6/2 fluctuate in orientation, and are causative of the unintentional colored portions in the image producing surface.

DESCRIPTION OF THE PREFERRED EMBODIMENTS

First Embodiment

Figure 1:
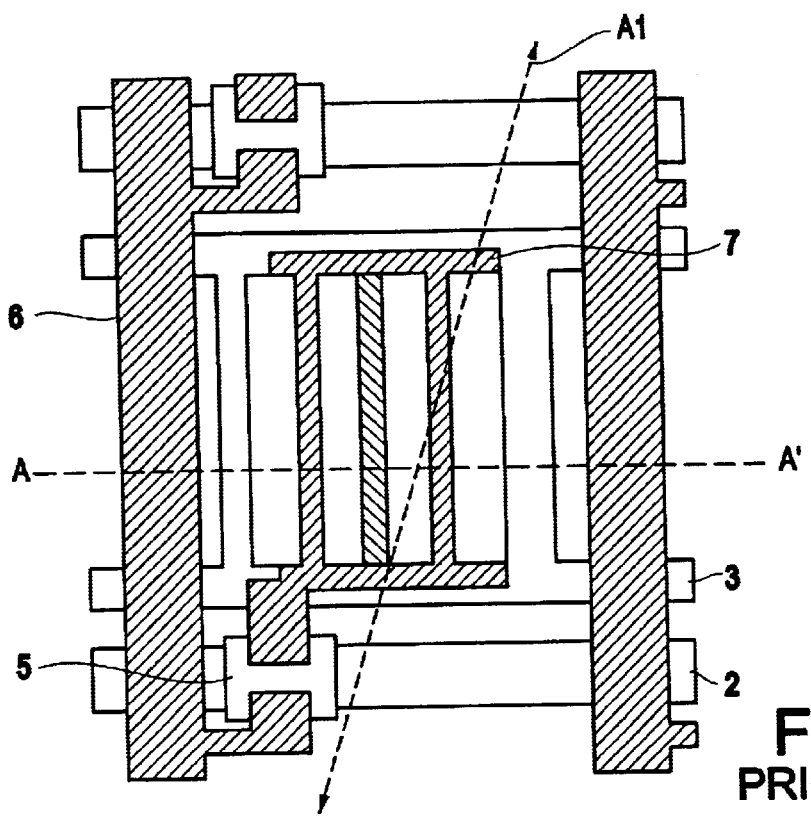
FIG. 1 is a plane view showing the layout of the electrodes on the transparent substrate incorporated in the prior art in-plane switching type liquid crystal display unit.
Figure 2:
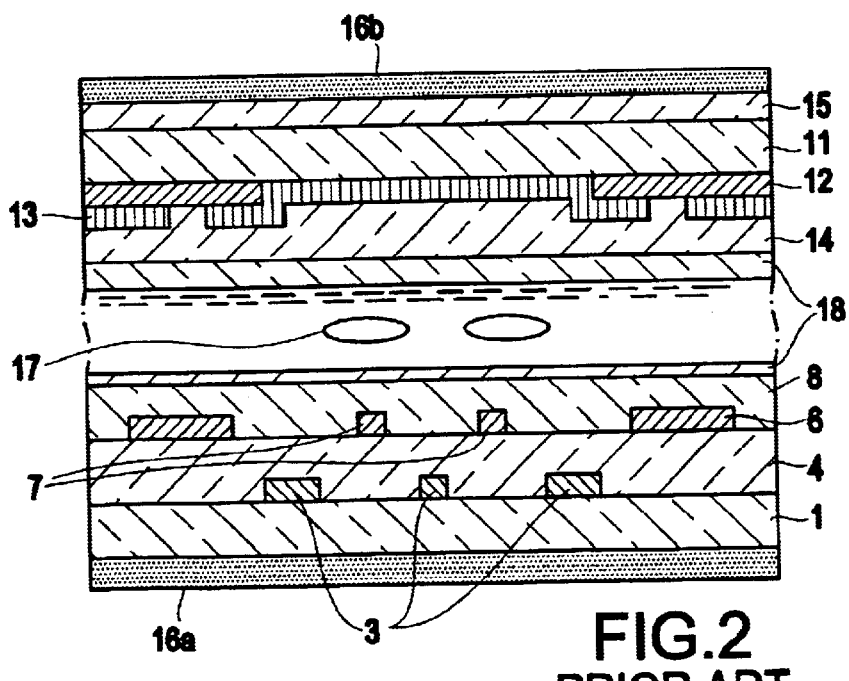
FIG. 2 is a cross sectional view taken along line A—A of FIG. 1 and showing the structure of the prior art in-plane switching type liquid crystal display unit.
Figure 7:
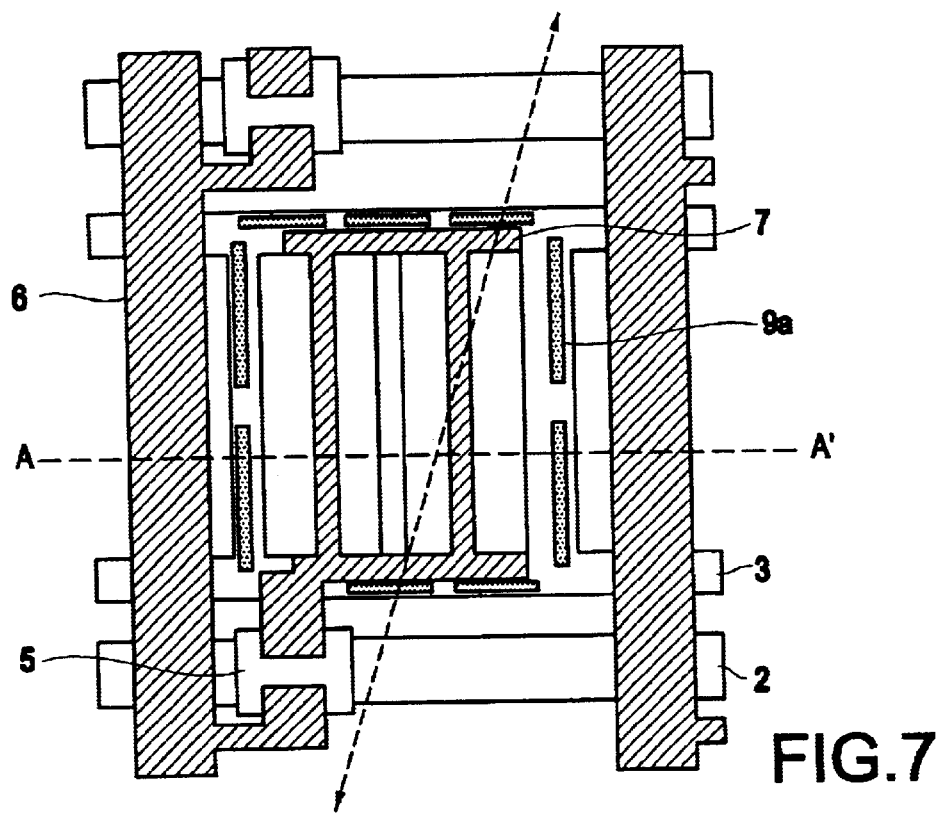
FIG. 7 is a plane view showing the layout of electrodes on the transparent substrate incorporated in an in-plane switching type liquid crystal display unit according to the present invention.
Figure 8:
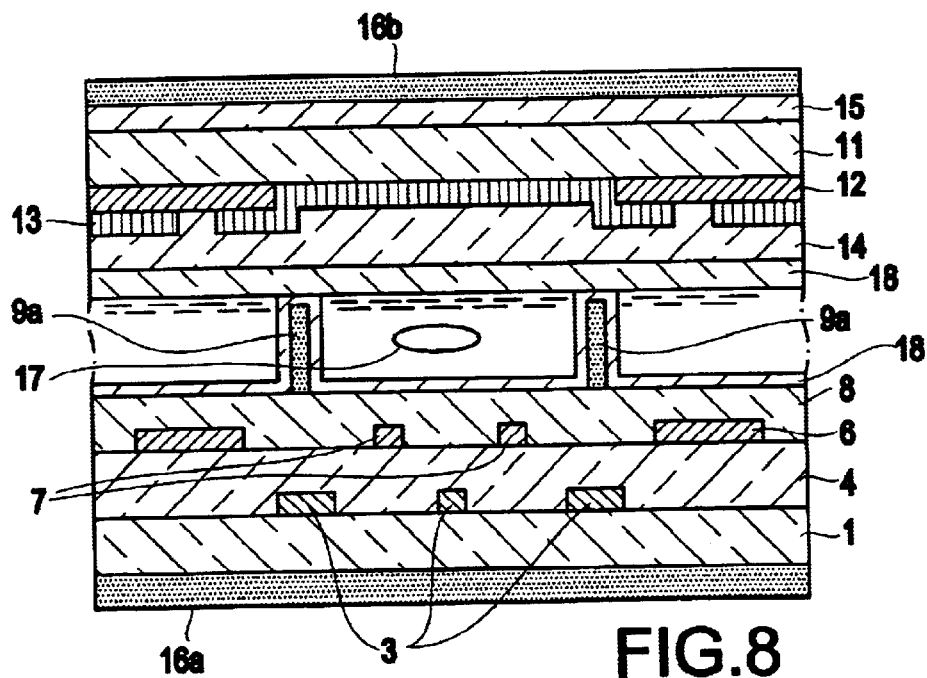
FIG. 8 is a cross sectional view taken along line A—A of FIG. 7 and showing the structure of the in-plane switching type liquid crystal display unit.

Referring to FIGS. 7 and 8 of the drawings, an in-plane switching type liquid crystal display unit embodying the present invention largely comprises a first substrate structure, a second substrate structure and liquid crystal 17. The first substrate structure and the second substrate structure are slightly spaced from each other, and the liquid crystal 17 fills the gap between the first substrate structure and the second substrate structure. Although a matrix of pixels is incorporated in the in-plane switching type liquid crystal display unit, one of the pixels is illustrated in FIGS. 1 and 2, and description is hereinbelow focused on the pixel.

The first substrate structure is fabricated on the basis of a transparent substrate 1. Gate electrodes 2 and a common electrode 3 are formed on the transparent substrate 1, and are covered with an inter-layered insulating layer 4. Data lines 6 and a pixel electrode 7 are patterned on the inter-layered insulating layer 4, and are covered with a passivation layer 8. The gate electrodes 2 extend in perpendicular to the data lines 6, and thin film transistors 5 are assigned to regions where the gate electrodes 2 cross the data lines 6. The thin film transistor 5 has a drain connected to the data line 6, and the pixel electrode 7 is connected to a source electrode of the thin film transistor 5. The gate electrode 2 passes under the channel region of the thin film transistor 5. The pixel electrode 7 is offset from the common electrode 3, and is in parallel to the common electrode 3. The thin film transistor 5 and the pixel electrode 7 are essential parts of the pixel. The data lines 6 and the pixel electrode 7 are hatched in FIG. 1 for discriminating them from other electrodes 2 and 3.

Insulating partition walls 9a are upright on the passivation layer 8. The insulating partition walls 9a separate the zone over the pixel electrode 7 from the zones in the vicinity of the gate electrode 2 and the data line 6. An orientation layer 18 is conformably formed on the passivation layer 8. The exposed surface of the passivation layer 8 and the insulating partition walls 9a are covered with the orientation layer 18. A polarizing plate 16a is attached to the other surface of the transparent substrate 1.

As will be described hereinlater in detail, the insulating partition walls 9a block the liquid crystal 17 inside thereof from the electric fields created due to the potential differences between the gate electrode/data line 2/6 and the common electrode 3 and the elastic influence of the liquid crystal around the gate electrode/data line 2/6. This results in that the distance between the gate electrode/data line 2/6 and the common electrode 3 is narrower than that of the prior art in-plane switching type liquid crystal display unit. Moreover, the common electrode 3 around the pixel electrode 7 is narrower than that of the prior art in-plane switching type liquid crystal display unit. Thus, the photo-shielded area is reduced, and the aperture ratio is improved.

On the other hand, the second substrate structure has a transparent substrate 11, and a black matrix 12 and colored layers 13 are formed on the surface of the transparent substrate 11. The colored layers 13 are colored in reds green and blue, and serve as color filters. One of the three primary color filters is opposed to the pixel electrode 7. The other two color filters 13 are respectively opposed to other pixel electrodes. The three primary color filters 13, the associated pixel electrodes 7, the associated thin film transistors 5 and part of the liquid crystal 17 therebetween form in combination the pixel. The black matrix 12 and the colored layers 13 are covered with flattening layer 14, and an orientation layer 18 if formed on the flattening layer 14. The other surface of the transparent substrate 11 is covered with a conductive layer 15, and a polarizing plate 16b is attached to the upper surface of the conductive layer 15.

The second substrate structure is spaced from the first substrate structure in such a manner that the orientation layers 18 are opposed to each other, and the liquid crystal 17 fills the gap between the orientation layers 18. The insulating partition walls 9a partially project the orientation layer 18, and cause the orientation layers to be held in contact with one another at the insulating partition walls 9a. The orientation layers 18 was subjected to a rubbing at a certain angle with respect to the longitudinal direction of the pixel electrode 7, and the liquid crystal 17 has homogenous orientation in a direction indicated by arrow A1.

The polarizing plate 16a has a plane of polarization which is perpendicular to a plane of polarization of the other polarization plate 16b. One of the planes of polarization is in parallel to the orientation of the liquid crystal molecules 17.

The transparency of the part of the liquid crystal over the pixel electrode 7 is changed as follows. A constant potential level is applied to the common electrode 3. When the gate electrode 2 is changed to an active high level, the thin film transistor 5 turns on, and an image-carrying signal is transferred from the associated data line 6 through the channel region to the pixel electrode 7. An electric field is created between the pixel electrode 7 and the common electrode 3, and the electric force is exerted on the liquid crystal molecules 17 of the pixel. The part of the liquid crystal is twisted in the plane parallel to the first substrate structure. As a result, the transparency of the pixel is changed.

Figure 9A:
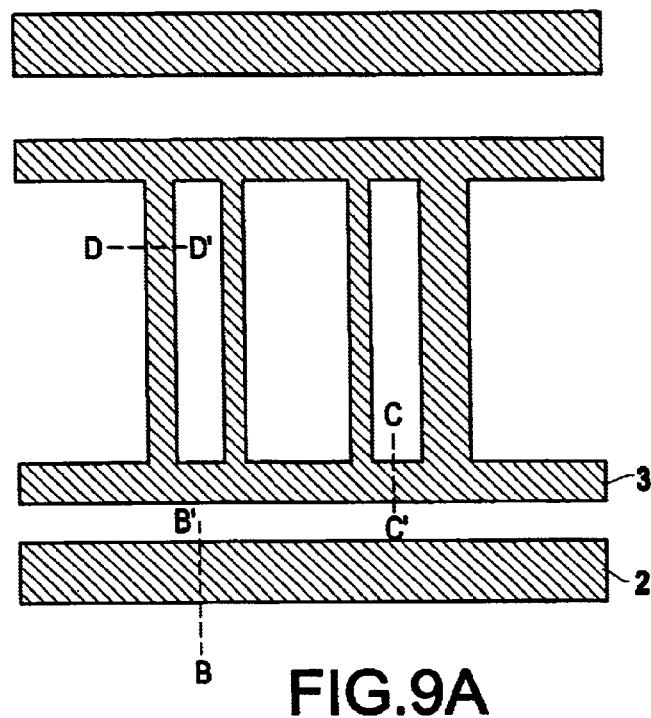
FIG. 9A is a plane view showing the layout of the electrodes in the first step of a process for fabricating the in-plane switching type liquid crystal display unit.
Figure 9B:
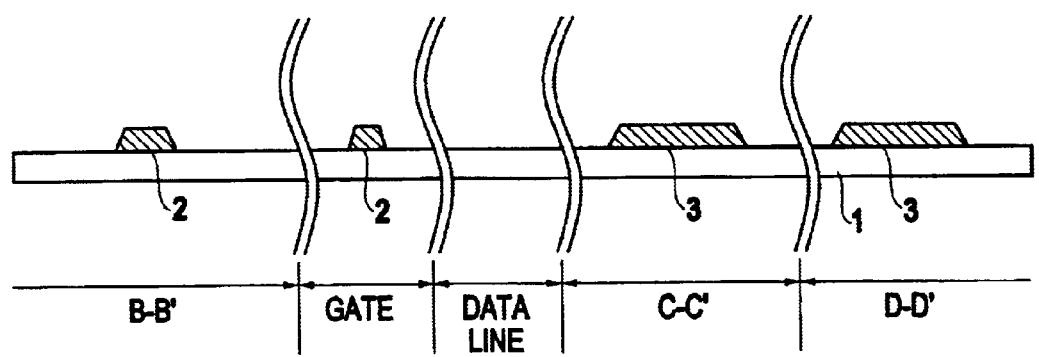
FIG. 9B is a cross sectional view taken along lines B–B', C–C', D–D' and along lines crossing a gate electrode and a data line in the first step.

A process for fabricating the in-plane switching type liquid crystal display unit is described with reference to FIGS. 9A and 9B to FIGS. 14A and 14B. The process starts with preparation of the transparent substrate 1. Conductive metal such as chromium Cr is deposited over the entire surface of the transparent substrate 1 by using a sputtering technique. Photo resist solution is spread over the chromium layer, and is baked for forming a photo-resist layer. Pattern image for the gate electrodes 2 and the common electrode 3 are transferred from a photo mask (not shown) to the photo resist layer so as to form a latent image in the photo resist layer. The latent image is developed, and a photo resist etching mask (not shown) is left on the chromium layer. Using the photo resist etching mask, the chromium layer is selectively removed through a wet etching, and the gate electrodes 2 and the common electrode 3 are formed on the transparent substrate 1. Thus, the chromium layer is patterned through the photo-lithographic techniques and the etching into the gate electrodes 2 and the common electrode 3. The photo resist etching mask is stripped off. The resultant structure is shown in FIGS. 9A and 9B.

Subsequently, insulating material such as silicon oxide is deposited over the entire surface of the resultant structure by using a chemical vapor deposition, and the gate electrodes and the common electrode 3 are covered with the silicon oxide layer 4a. Silicon nitride, amorphous silicon and heavily-doped n-type amorphous silicon are successively deposited over the silicon oxide layer 4a by using a plasma-assisted chemical vapor deposition, and form a silicon nitride layer 4b, an amorphous silicon layer 5a and a heavily-doped n-type amorphous silicon layer 5b.

Figure 10A:
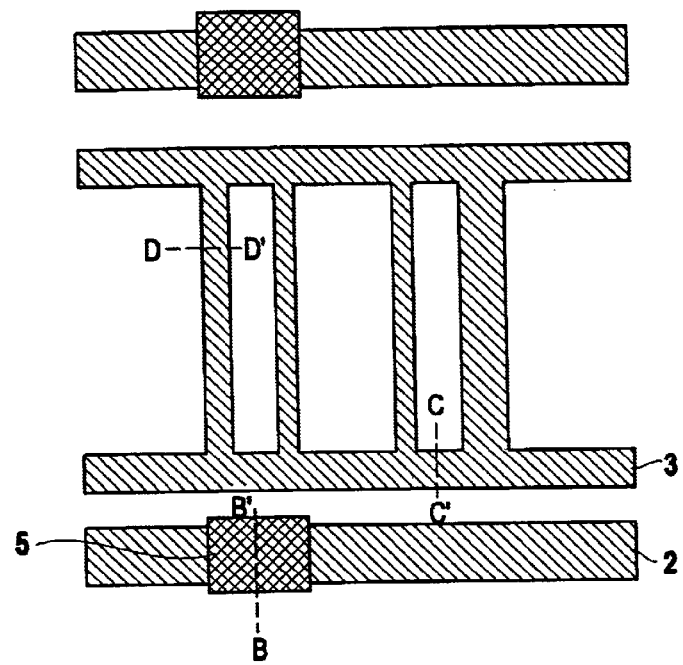
FIG. 10A is a plane view showing the layout of the electrodes in the second step of the process for fabricating the in-plane switching type liquid crystal display unit.
Figure 10B:
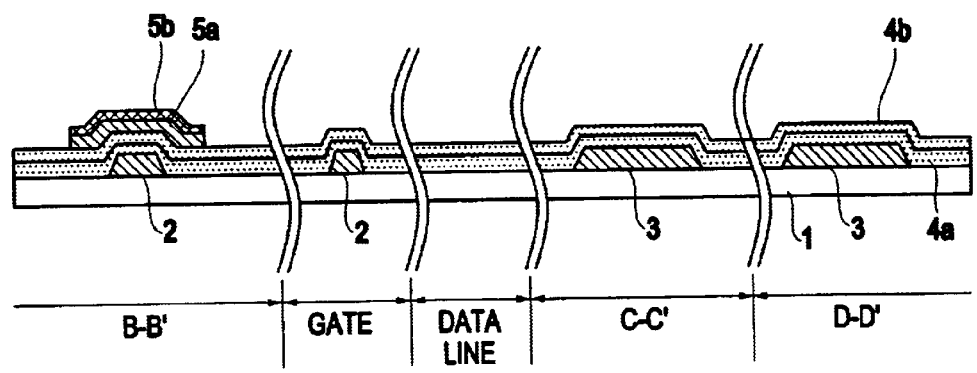
FIG. 10B is a cross sectional view taken along lines B–B', C–C', D–D' and along lines crossing the gate electrode and the data line in the second step.

A photo resist etching mask is formed on the heavily-doped n-type amorphous silicon layer 5b by using the photo-lithographic techniques. Using the photo resist etching mask, the heavily-doped n-type amorphous silicon layer 5b and the amorphous silicon layer 5a are partially etched away by using a dry etching technique. The gate electrode 2 is overlapped with the heavily doped n-type amorphous silicon layer 5b and the amorphous silicon layer 5a, and the heavily doped n-type amorphous silicon layer 5b and the amorphous silicon layer 5a are spread from the region over the gate electrode 2. The photo resist etching mask is stripped off. Thus, the source/drain regions and the channel region are prepared for the thin film transistor 5 in the heavily doped n-type amorphous silicon layer 5b and the amorphous silicon layer 5a as shown in FIGS. 10A and 10B.

Figure 11A:
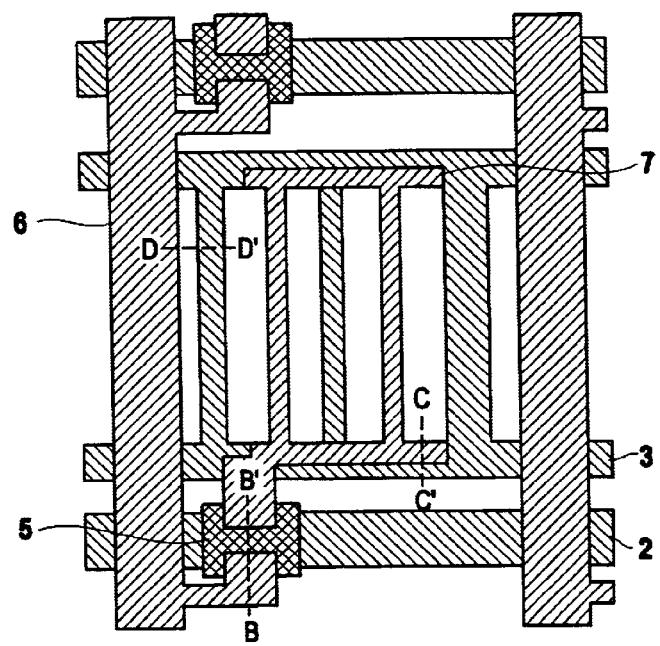
FIG. 11A is a plane view showing the layout of the electrodes in the third step of the process for fabricating the in-plane switching type liquid crystal display unit.
Figure 11B:
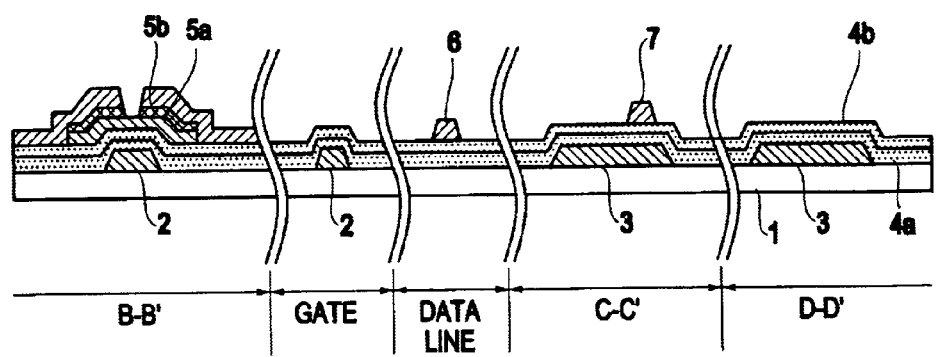
FIG. 11B is a cross sectional view taken along lines B–B', C–C', D–D' and along lines crossing the gate electrode and the data line in the third step.

The chromium is deposited over the entire surface of the resultant structure by using the sputtering technique, and a photo resist etching mask (not shown) is formed on the chromium layer through the photo lithographic techniques. Using the photo resist etching mask, the chromium layer is partially removed by using a wet etching and a dry etching, and the chromium layer is patterned into the data lines 6, source/drain electrodes and the pixel electrode 7. The drain electrode is connected to the associated data line 6, and is held in contact with the drain region. On the other hand, the source electrode is connected to the pixel electrode 7, and is held in contact with the source region. The photo resist etching mask is stripped off. Using the source/drain electrodes as an etching mask, the heavily doped n-type amorphous silicon layer 5b is partially removed by using the dry etching, and the amorphous silicon layer 5a is exposed to the gap between the source electrode and the drain electrode as shown in FIGS. 11A and 11B.

Figure 12A:
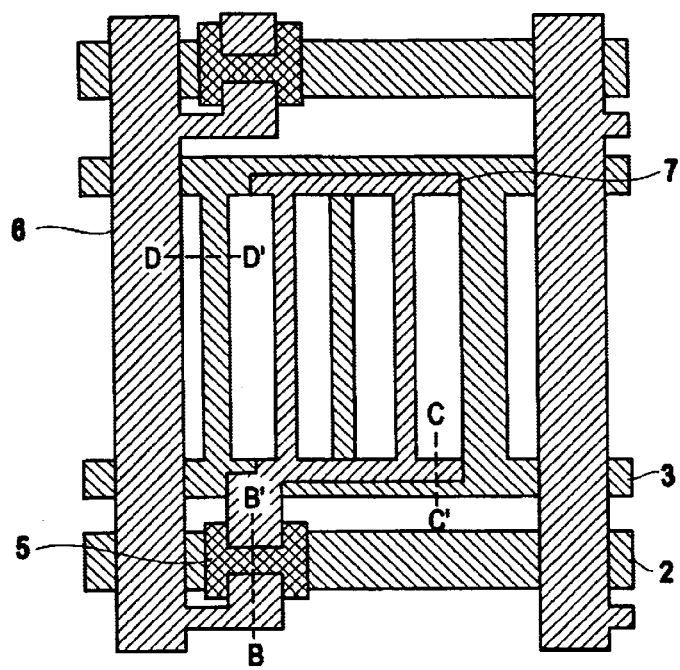
FIG. 12A is a plane view showing the layout of the electrodes in the fourth step of the process for fabricating the in-plane switching type liquid crystal display unit.
Figure 12B:
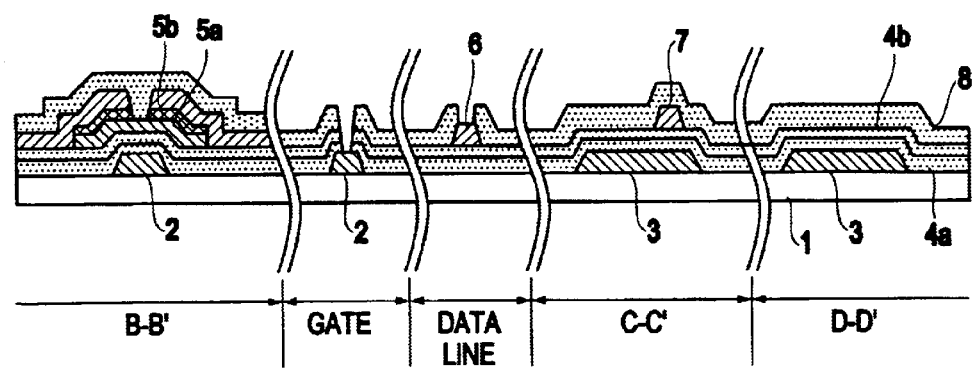
FIG. 12B is a cross sectional view taken along lines B–B', C–C', D–D' and along lines crossing the gate electrode and the data line in the fourth step.

Subsequently, silicon nitride is deposited over the entire surface of the resultant structure by using a plasma-assisted chemical vapor deposition, and forms the passivation layer 8. A photo resist etching mask (not shown) is formed on the passivation layer 8 by using the photo-lithographic techniques for contact holes. Using the photo resist etching mask, the passivation layer 8, the silicon nitride layer 4b and the silicon oxide layer 4a are partially removed for forming contact holes, and the gate electrode 2 and the data line 6 are exposed to the contact holes, respectively, as shown in FIGS. 12A and 12B. The photo resist etching mask is stripped off.

Figure 13A:
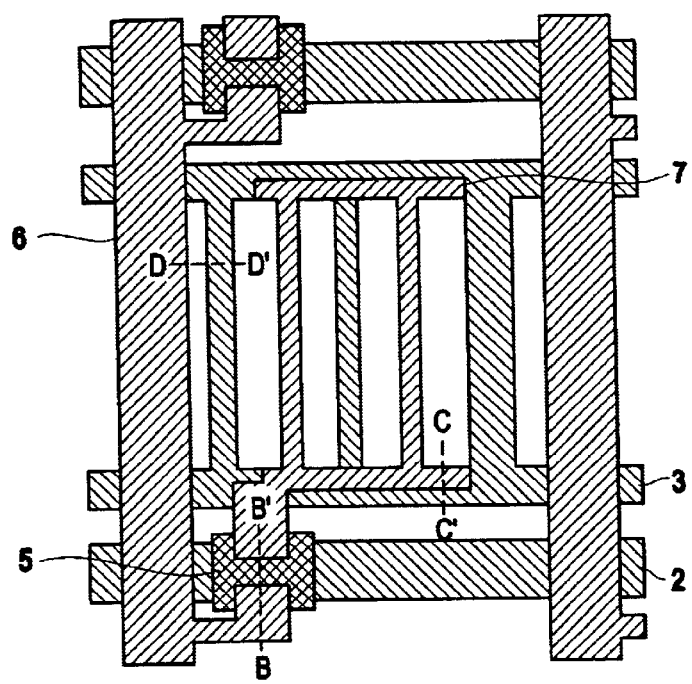
FIG. 13A is a plane view showing the layout of the electrodes in the fifth step of the process for fabricating the in-plane switching type liquid crystal display unit.
Figure 13B:
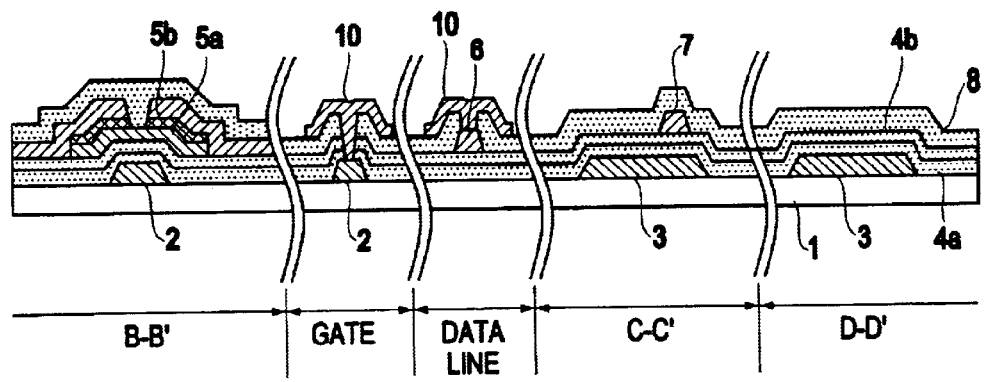
FIG. 13B is a cross sectional view taken along lines B–B', C–C', D–D' and along lines crossing the gate electrode and the data line in the fifth step.

Subsequently, indium tin oxide is deposited over the entire surface of the resultant structure by using a sputtering technique. The indium tin oxide fills the contact holes, and swells into an indium tin oxide layer over the passivation layer 8. A photo resist etching mask (not shown) is formed on the indium tin oxide layer through the photo lithographic techniques. Using the photo resist etching mask, the indium tin oxide layer is partially removed by using a wet etching so as to pattern the indium tin oxide layer into a gate terminal 10 and a drain terminal 10 as shown in FIGS. 13A and 13B. The photo resist etching mask is stripped off, and the resultant structure is annealed under predetermined conditions.

Figure 14A:
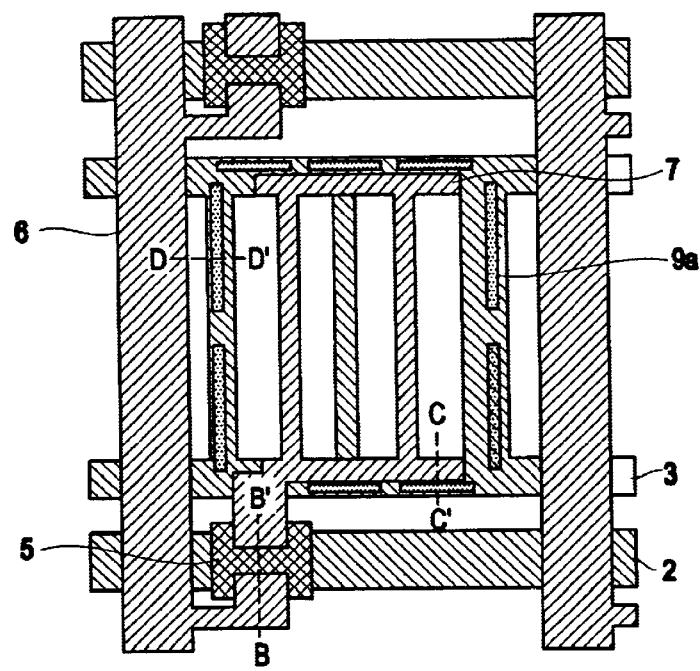
FIG. 14A is a plane view showing the layout of the electrodes in the sixth step of the process for fabricating the in-plane switching type liquid crystal display unit.
Figure 14B:
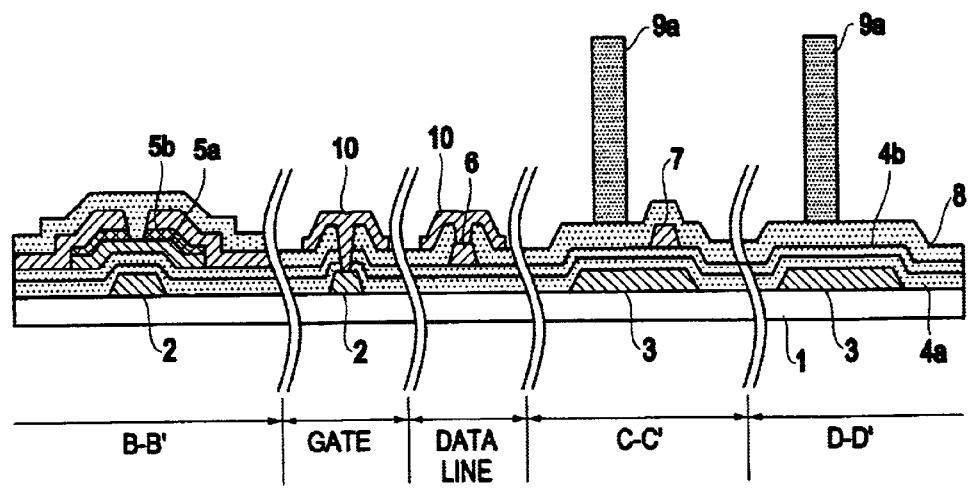
FIG. 14B is a cross sectional view taken along lines B–B', C–C', D–D' and along lines crossing the gate electrode and the data line in the sixth step.

Before forming the orientation layer 18, the insulating partition walls 9a are formed on the resultant structure. The insulating partition walls 9a separate the zone over the pixel electrode 7 from the zones in the vicinity of the gate electrode/data line 2/6. For this reason, the partition walls 9a are positioned over the common electrode 3 around the pixel electrode 7. The insulating partition walls 9a are formed as follows. First, photo-sensitive resin such as, for example, photo resist or polyimide is spread over the entire surface of the resultant structure, and is adjusted to an appropriate thickness. The region over the common electrode 3 is shielded with a photo mask (not shown), and the remaining portion of the photo sensitive layer is exposed to light for forming a latent image. The latent image is developed. Then, the photo sensitive layer is patterned into vertical walls corresponding to the insulating partition walls 9a. The vertical walls are baked so as to form the insulating partition walls 9a over the common electrode 3 around the pixel electrode 7. The resultant structure is shown in FIGS. 14A and 14B.

The second substrate structure is fabricated prior to, posterior to or in parallel to the first substrate structure. The orientation layers 18 are formed on the passivation layer 8 and the insulating partition walls 9a of the first substrate structure and the flattering layer 14 of the second substrate structure, respectively. The first substrate structure is assembled with the second substrate structure, and the liquid crystal is injected into the gap between the first substrate structure and the second substrate structure.

The height of the insulating partition walls 9a is approximately equal to the gap between the first substrate structure and the second substrate structure. For this reason, the orientation layer 18 of the first substrate structure is held in contact with the other orientation layer 18 on the flattening layer 14 at the insulating partition walls 9a. Thus, the zone over the pixel electrode 7 is surely separated from the zones in the vicinity of the gate electrode/data line 2/6. The insulating partition walls 9a are spaced from one another. In other words, the zone over the pixel electrode 7 is connected through the gaps between the insulating partition walls 9a to the zone therearound. The gaps are required, because the liquid crystal 17 enters into the zone over the pixel electrode through the gaps. When the manufacturer designs the insulating partition walls 9a and, accordingly, the gaps, the properties of liquid crystal 17 such as, for example, the viscosity are taken into account.

Figure 15:
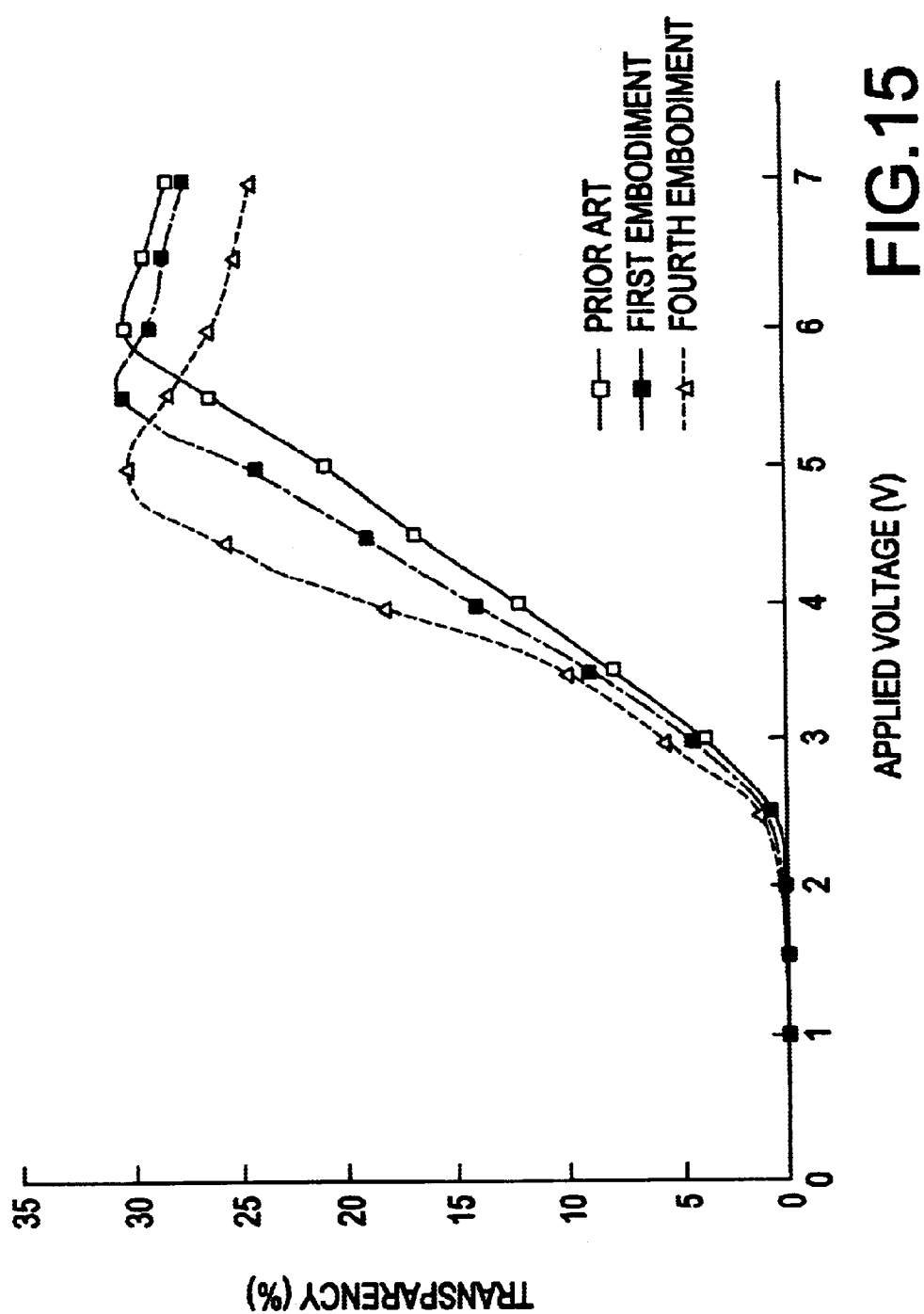
FIG. 15 is a graph showing relation between the transparency of a pixel and applied voltage.
Figure 16:
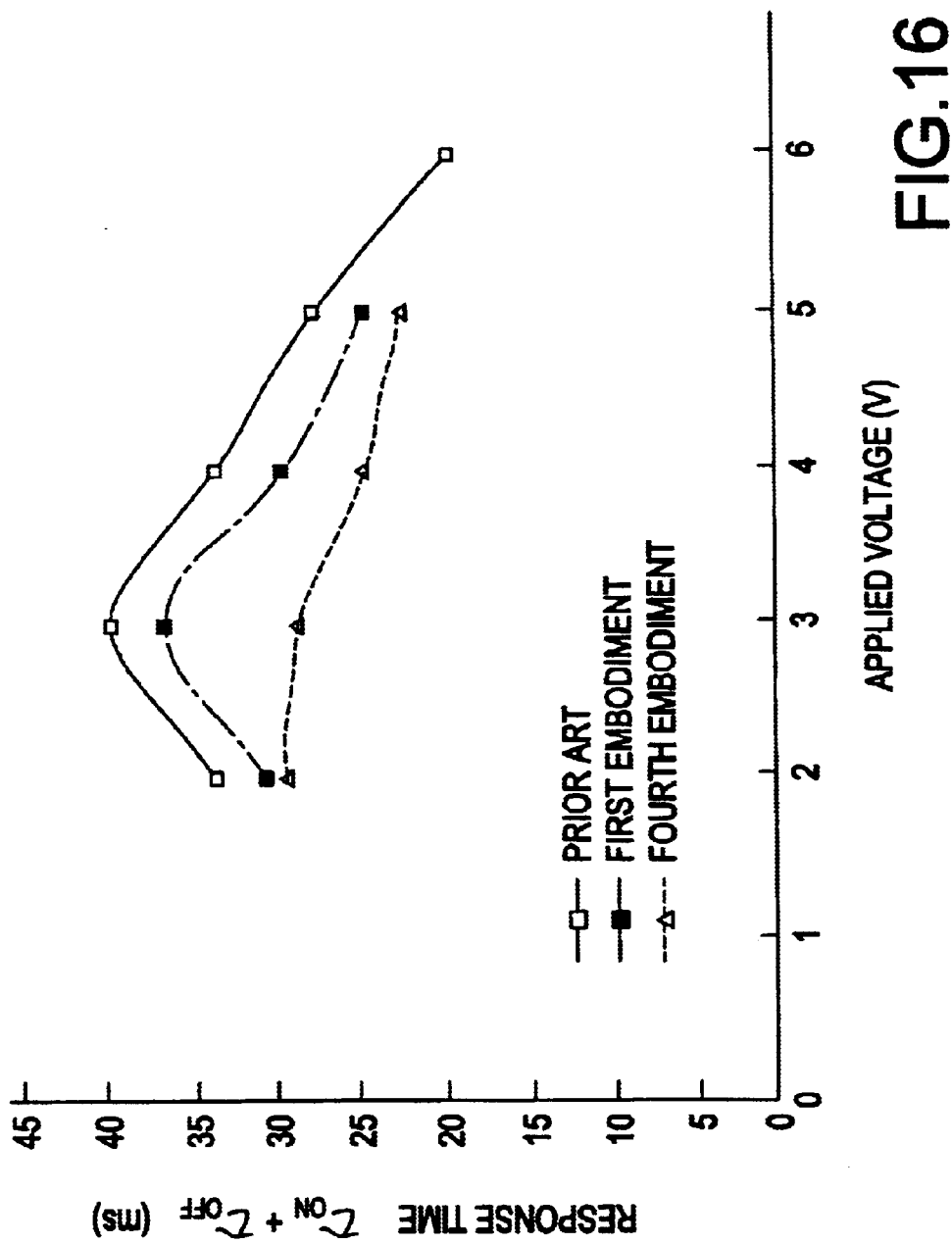
FIG. 16 is a graph showing relation between the response tome and the applied voltage.

The present inventor evaluated the in-plane switching type liquid crystal display unit according to the present invention. The present inventor fabricated sample 1 of the prior art in-plane switching type liquid crystal display unit and sample 2 of the in-plane switching type liquid crystal display unit implementing the first embodiment. The present inventor varied the potential difference between the pixel electrode 7 and the common electrode 3, and measured the transparency of the pixel and the response time. The experimental data was plotted in FIGS. 15 and 16. White squares stood for the experimental data of sample 1, i.e., the prior art in-plane switching type liquid crystal display unit, and black squares were representative of the experimental data of sample 2, i.e., the in-plane switching type liquid crystal display unit implementing the first embodiment featured by the insulating partition walls 9a.

Comparing sample 2 with sample 1, it is understood that the in-plane switching type liquid crystal display unit implementing the first embodiment achieves the maximum transparency at the applied voltage lower than the applied voltage required for the maximum transparency in the prior art in-plane switching type liquid crystal display unit. In other words, the in-plane switching type liquid crystal display unit implementing the first embodiment has the threshold of the pixel lower than the threshold of the prior art in-plane switching type liquid crystal display unit. The reduction of the applied voltage or the threshold suggests that the insulating partition walls 9a is effective against the elasticity of the liquid crystal molecules under the influences of the electric fields between the gate electrode/data line 2/6 and the common electrode 3.

As to the response time, the prior art in-plane switching type liquid crystal display unit requires the time period longer than that of the in-plane switching type liquid crystal display unit over the whole range of the applied voltage. The short response time suggests that the insulating partition walls 9a eliminates the undesirable influence of the liquid crystal around the gate electrode/data line 2/6 from the twisting motion of the liquid crystal over the pixel electrode 7.

As will be understood, the liquid crystal in the zone over the pixel electrode 7 is separated from the liquid crystal in the zones around the gate electrode/data line 2/6 by means of the insulating partition walls 9a. Although electric fields are created due to the potential difference between the data line 6 and the common electrode 3 and the potential difference between the gate electrode 2 and the common electrode 3, the liquid crystal in the zone over the pixel electrode 7 is free from the influences of the electric fields, and is twisted only in the electric field created between the pixel electrode 7 and the common electrode 3.

The elasticity of the liquid crystal in the vicinity of the gate electrode/data line 2/6 inhibits the liquid crystal over the pixel electrode 7 from the twisting motion in the presence of the electric field created due to the potential difference between the pixel electrode 7 and the common electrode 3 in the prior art in-plane switching type liquid crystal display unit. The insulating partition walls 9a isolate the liquid crystal in the zone over the pixel electrode 7 from the undesirable elastic influence of the liquid crystal around the gate electrode/data line 2/6. This results in a prompt response of the pixel to the image carrying signal. In other words, the liquid crystal in the zone over the pixel electrode 7 is quickly twisted for changing the transparency thereof.

Moreover, even though the distance between the gate electrode/data line 2/6 and the common electrode 3 and the width of the common electrode 3 are reduced, the image carrying signal promptly changes the transparency of the pixel by virtue of the insulating partition walls 9a. The reduction of the distance results in the improvement of the photo-shield area, and the narrow common electrode 3 improves the aperture ratio.

The liquid crystal 17 over the pixel electrode 7 is isolated from the electric fields between the gate electrode/data line 2/6 and the common electrode 3. This means that the electric fields do not give rise to any twisting motion of the liquid crystal 17 inside the insulating partition walls 9a. In other words, the electric fields do not make the liquid crystal 17 in the vicinity of the common electrode 3 fluctuate in orientation. For this reason, the pixel is never unintentionally colored, and the in-plane switching type liquid crystal display unit according to the present invention achieves good visual angle.

Finally, the insulating partition walls 9a are formed from the photo sensitive resin adjusted to a target thickness. This means that the insulating partition walls 9a are uniform in height. The insulating partition walls 9a cause the orientation layer 18 to be held in contact with the other orientation layer. Thus, the insulating partition walls 9a serve as a spacer, and keeps the gap between the first and second substrate structures constant.

Second Embodiment

Figure 17:
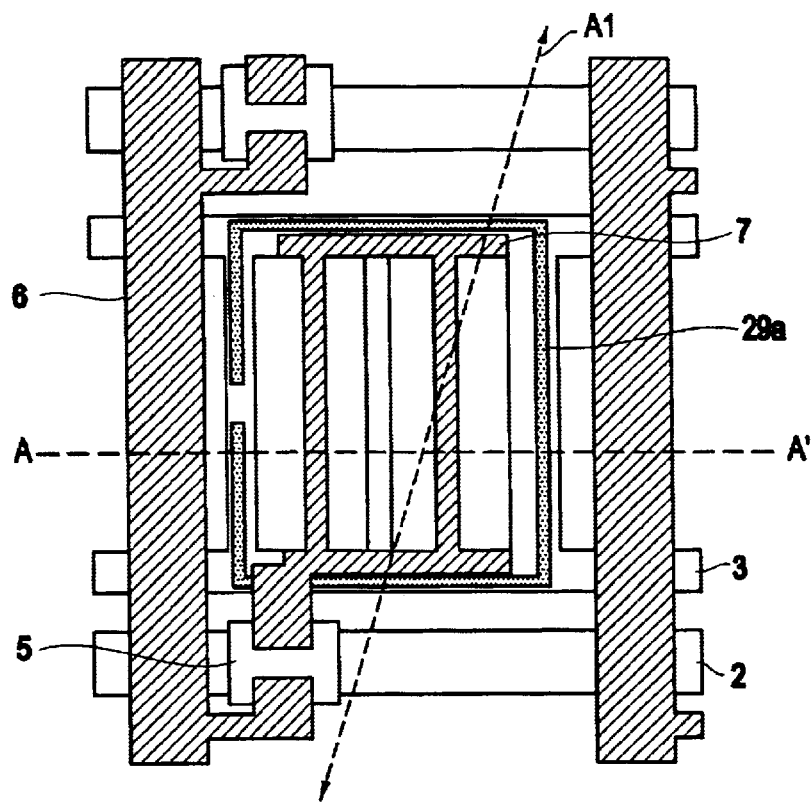
FIG. 17 is a plane view showing the layout of electrodes incorporated in another in-plane switching type liquid crystal display unit according to the present invention.
Figure 18:
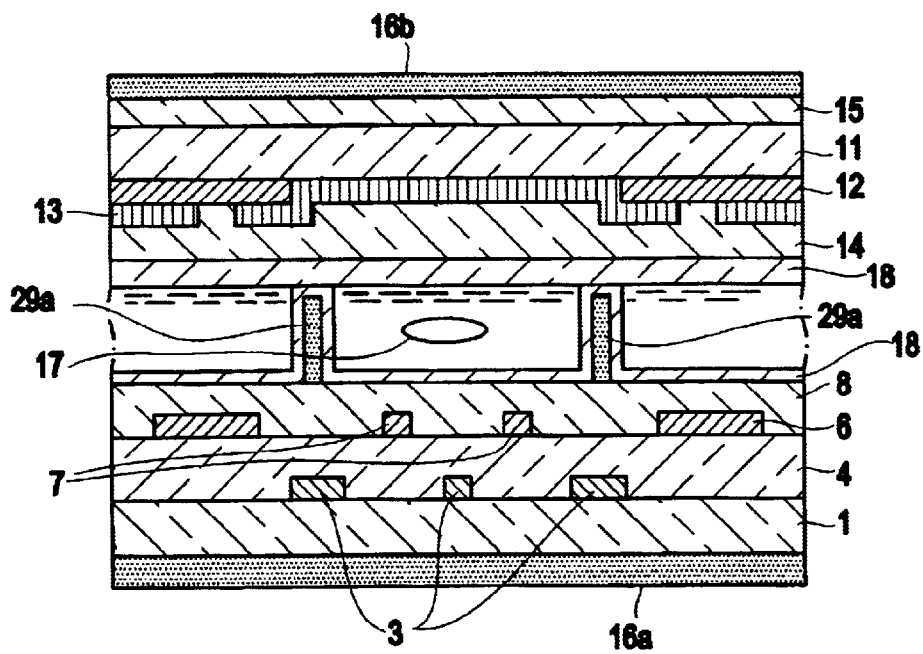
FIG. 18 is a schematic cross sectional view taken along line A–A' of FIG. 17 and showing the structure of the in-plane switching type liquid crystal display unit.
Figure 19:
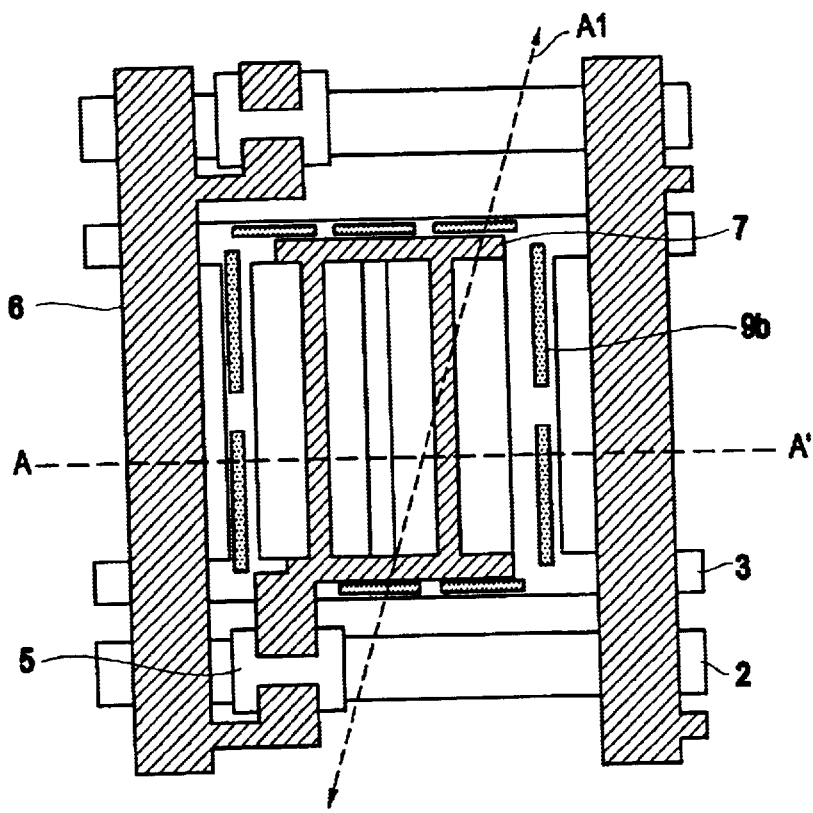
FIG. 19 is a plane view showing the layout of electrodes incorporated in yet another in-plane switching type liquid crystal display unit according to the present invention.
Figure 20:
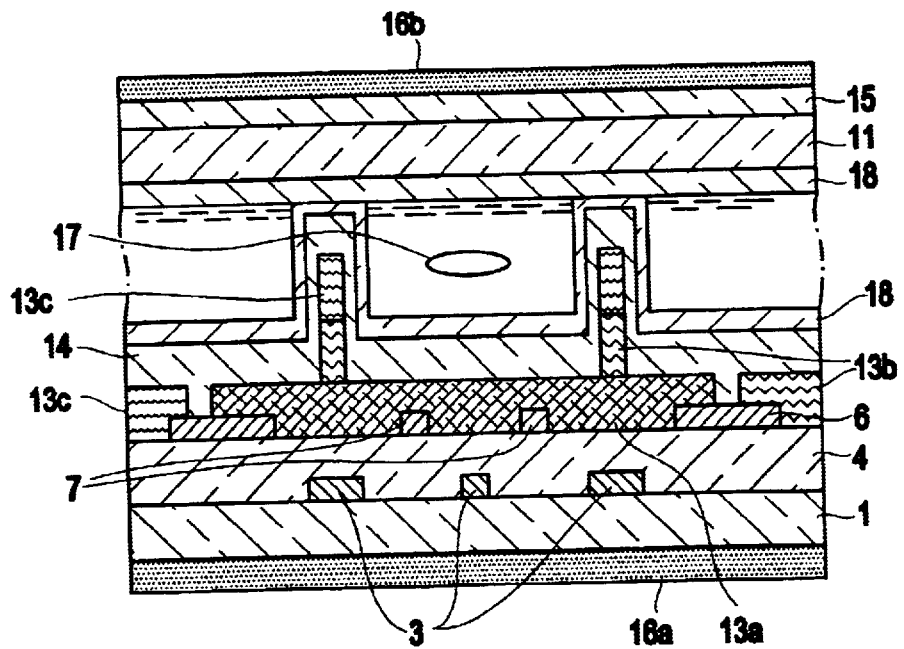
FIG. 20 is a schematic cross sectional view taken along line A–A' of FIG. 19 and showing the structure of the in-plane switching type liquid crystal display unit.
Figure 21:
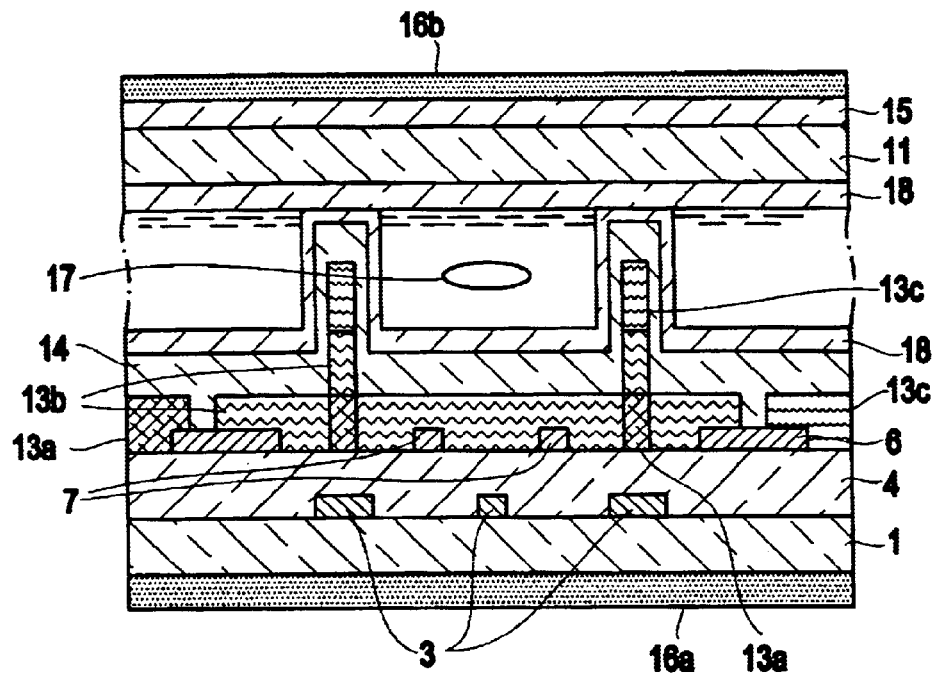
FIGS. 21 and 22 are schematic cross sectional views showing insulating partition walls on other color filters forming parts of the pixel shown in FIG. 20.
Figure 22:
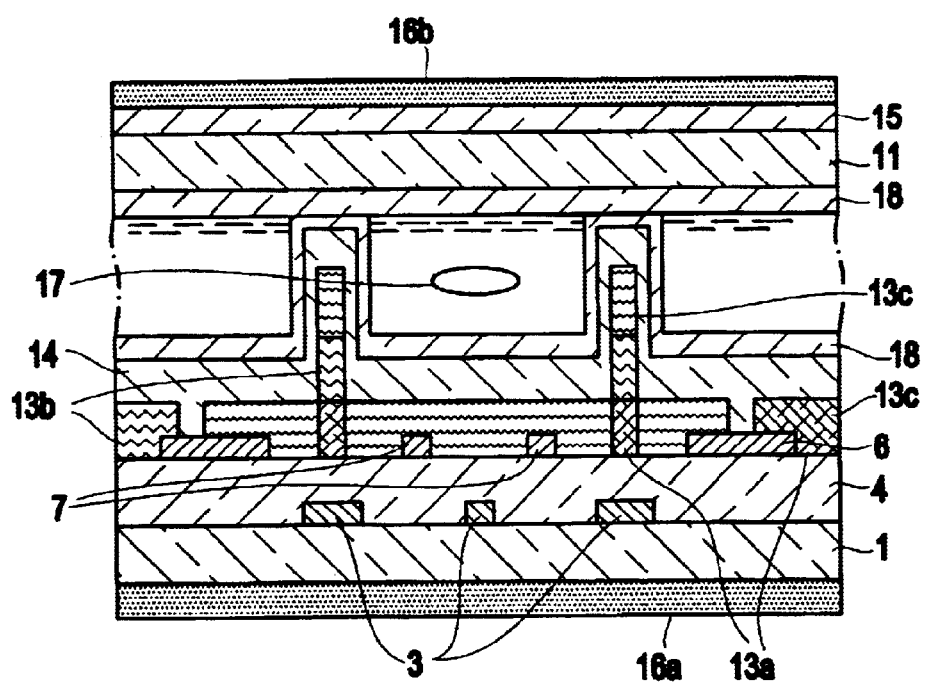

Turning to FIGS. 17 and 18 of the drawings, another in-plane switching type liquid crystal display unit embodying the present invention largely comprises a first substrate structure, a second substrate structure and liquid crystal 17 filling the gap between the first substrate structure and the second substrate structure. The first and second substrate structures are similar to those of the first embodiment except an insulating partition wall 29a. For this reason, layers and electrodes of the second embodiment are labeled with the references designating corresponding layers and electrodes of the first embodiment without detailed description.

The insulating partition wall 29a is also located on the common electrode 3 around the pixel electrode 7. However, the insulating partition wall 29a is continuous, and is not separated into walls. For this reason, the liquid crystal 17 over the pixel electrode 7 is perfectly isolated from the liquid crystal 17 outside the insulating partition wall 29a, and only the electric field due to the potential difference between the common electrode 3 and the pixel electrode 7 influences the orientation of the liquid crystal molecules 17. Even though the electric fields due to the potential differences between the gate electrode/data line 2/6 and the common make the liquid crystal molecules outside the insulating partition wall 29a differently oriented, the elasticity of the liquid crystal 17 outside the insulating partition wall 29a does not have any influence on the orientation of the liquid crystal molecules inside the insulating partition wall 29a. Especially, the liquid crystal molecules 17 inside the insulating partition wall 29a return to the initial orientation without any elastic influence of the liquid crystal molecules 17 outside the insulating partition wall 29a for changing the pixel from white to black.

The perfect isolation eliminates the pixel from undesirable coloring due to the fluctuation in orientation of the liquid crystal molecules 17 in the vicinity of the common electrode 3. The pixel is changed between black and white more promptly than the pixel of the first embodiment is, and the view angle characteristics are further improved.

The distance between the gate electrode/data line 2/6 and the common electrode 3 is narrower than the corresponding distance in the prior art, and the common electrode 3 per se is narrower than the corresponding common electrode 3 of the prior art. Thus, the shield area is reduced, and the aperture ratio is improved. Moreover, the insulating partition wall 29a causes the orientation layer 18 to be held in contact with the other orientation layer 18 thereat, and keeps the gap between the orientation layers 18 constant.

The in-plane switching type liquid crystal display unit implementing the second embodiment is fabricated through a process, which is similar to the process described in conjunction with the first embodiment except the step of introducing the liquid crystal 17 into the gap. Since the insulating partition wall 29a isolates the zone over the pixel electrode 7 from the zone outside thereof, it is difficult to inject the liquid crystal 17 into the gap with the assistance of vacuum. A dropping injection is used for the in-plane switching type liquid crystal display unit implementing the second embodiment. In order to accelerate the injection of the liquid crystal 17, the insulating partition wall may be designed to have the height less than the gap between the orientation layers 18. A gap takes place between the orientation layers 18. Although the gap a little bit lessens the effect of the insulating partition wall 29a, the liquid crystal 17 easily flows into the zone inside the insulating partition wall 29a.

Third Embodiment

FIGS. 19 to 22 show yet another in-plane switching type liquid crystal display unit embodying the present invention. The in-plane switching type liquid crystal display unit implementing the third embodiment is different from the first and second embodiments in that partition walls 9b are formed by using synthetic resin layers for colored layers 13a, 13b and 13c on the substrate structure together with the thin film transistors.

In detail, the in-plane switching type liquid crystal display unit implementing the third embodiment largely comprises a first substrate structure, a second substrate structure and liquid crystal 17 filling the gap between the first substrate structure and the second substrate structure.

The first substrate structure is fabricated on the basis of a transparent substrate 1. Gate electrodes 2 and a common electrode 3 are formed on the transparent substrate 1, and are covered with an inter-layered insulating layer 4. Data lines 6 and a pixel electrode 7 are patterned on the inter-layered insulating layer 4, and the pixel electrode 7 and parts of the adjacent data lines 6 are covered with a color filter 13a. In this instance, the color filter 13a is red. Adjacent pixel electrodes (not shown) are respectively covered with color filters 13b and 13c. The color filter 13b is green, and the other color filter 13c is blue. Insulating partition walls 9b are formed on the color filters 13a, 13b and 13c, and are located over the common electrode 3 around the pixel electrode 7. The insulating partition walls 9b are spaced from one another, and gaps take place therebetween. The insulating partition walls 9b on the color filter 13a are formed from synthetic resin layers together with the other color filters 13b/13c. The insulating partition walls 9b on the color filter 13b are formed from synthetic resin layers together with the other color filters 13a/13c (see FIG. 21), and the insulating partition walls 9b on the color filter 13c are formed from synthetic resin layers together with the other color filters 13a/13b (see FIG. 22).

The color filters 13a, 13b and 13c are covered with a flattening layer 14, and an orientation layer 18 is laminated on the flattening layer 14. The gate electrode 2 forms a thin film transistor 5 together with a silicon nitride layer and amorphous silicon layers similar to the first embodiment. An orientation layer 18 is conformably formed on the flattening layer 14. The data lines 6 and the pixel electrode 7 are hatched in FIG. 19 for discriminating them from other electrodes 2 and 3.

On the other hand, the second substrate structure has a transparent substrate 11, and the transparent substrate 11 is sandwiched between a conductive layer 15 and an orientation layer 18. A polarizing plate 16b is laminated on the conductive layer 15.

The second substrate structure is spaced from the first substrate structure in such a manner that the orientation layers 18 are opposed to each other, and the liquid crystal 17 fills the gap between the orientation layers 18. The insulating partition walls 9b partially project the orientation layer 18, and cause the orientation layers to be partially held in contact with one another. The orientation layers 18 was subjected to a rubbing at a certain angle with respect to the longitudinal direction of the pixel electrode 7, and the liquid crystal 17 has homogenous orientation in a direction indicated by arrow A1.

The in-plane switching type liquid crystal display unit is fabricated as follows. The gate electrode and the common electrode 3 are patterned on the transparent substrate 1, and are covered with the inter-layered insulating layer 4. The data lines 6 and the pixel electrode 7 are patterned on the inter-layered insulating layer 4.

Subsequently, the color filters 13a/13b/13c and the insulating partition walls 9b are successively formed from the synthetic resin layers. The resultant structure is covered with the red synthetic resin layer, and the red synthetic resin layer is patterned into the red filter 13a and lower parts of the insulating partition walls 9b in the regions assigned to the green filter 13b and the blue filter 13c. The resultant structure is covered with the green synthetic resin layer, and the green synthetic resin layer is patterned into the green filter 13b, middle parts of the insulating partition walls 9b on the lower parts and lower parts of the insulating partition walls 9*b* on the red filter 13*a*. Finally, the resultant structure is covered with the blue synthetic resin layer, and the blue synthetic resin layer is patterned into the blue filter 13*c*, the higher parts of the insulating partition walls 9*b* on the middle parts and higher parts of the insulating partition walls 9*b* over the red filter 13*a*. Thus, the insulating partition walls 9*b* are formed from the colored synthetic resin layers concurrently with the color filters 13*a*/13*b*/13*c*. In other words, any addition step is not required for the insulating partition walls 9*b*. The flattering layer 14 is conformably formed on the resultant structure, i.e., color filters 13*a*/13*b*/13*c* and the insulating partition walls 9*b*, and the orientation layer 18 is laminated on the flattering layer 14.

The second substrate structure is prepared. The first substrate structure is assembled with the second substrate structure, and the liquid crystal is injected into the gap between the first substrate structure and the second substrate structure.

Although any black matrix is not shown in FIGS. 19 to 22, the in-plane switching type liquid crystal display unit includes a black matrix. The black matrix is incorporated in either first or second substrate structure. In case where the black matrix is formed in the first substrate structure, the black matrix is inserted between the data lines 6 and the color filters 13*a*/13*b*/13*c*. On the other hand, when the black matrix is formed in the second substrate structure, the black matrix is inserted between the orientation layer 18 and the transparent substrate 11.

As will be understood from the foregoing description, the insulating partition walls 9*b* achieve all the advantages of the first embodiment. In this instance, the insulating partition walls 9*b* are formed from the colored synthetic resin layers concurrently with the color filters 13*a*/13*b*/13*c*. This feature is desirable, because the steps for forming the partition walls 9*a* are not required. Thus, the process for the third embodiment is simpler than the process for the first embodiment. The color filters 13*a*/13*b*/13*c* are formed in the first substrate structure together with the gate electrodes 2, the data lines 6 and the common electrode 3, and the manufacturer can exactly align those component parts 13*a*/13*b*/13*c*/2/6/3. If the black matrix is also formed in the first substrate structure, the black matrix is exactly positioned with respect to the data lines 6. Thus, the component parts 13*a*/13*b*/13*c*/2/6/3 and the black matrix are exactly aligned with one another, and the margin is reduced. This results in the aperture ratio larger than those of the first and second embodiments.

Figure 23:
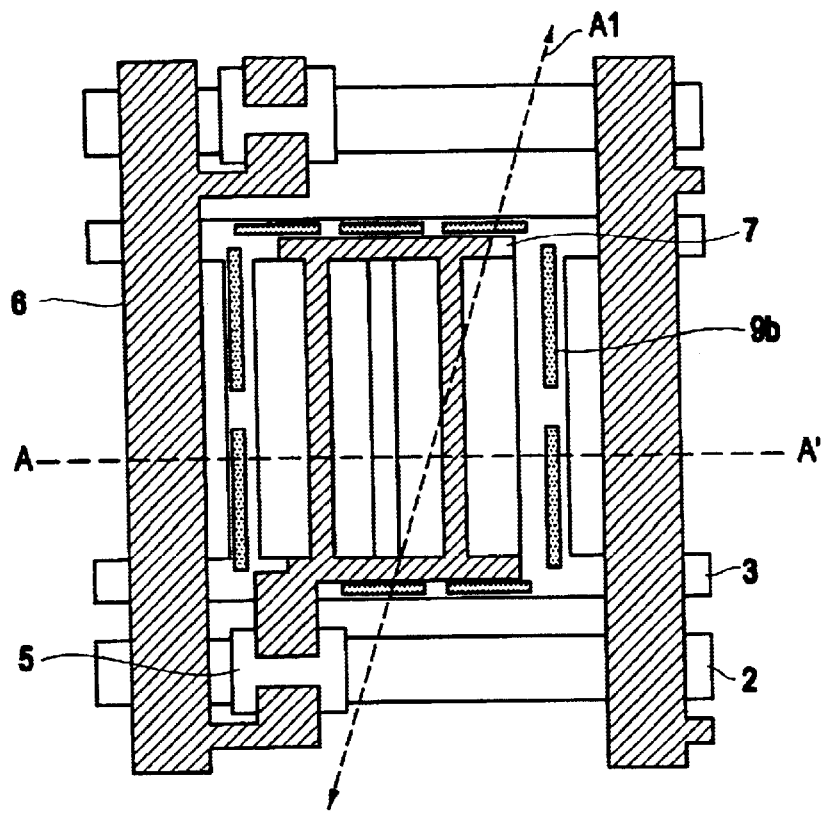
FIG. 23 is a plane view showing the layout of electrodes incorporated in a modification of the in-plane switching type liquid crystal display unit shown in FIG. 19.
Figure 24:
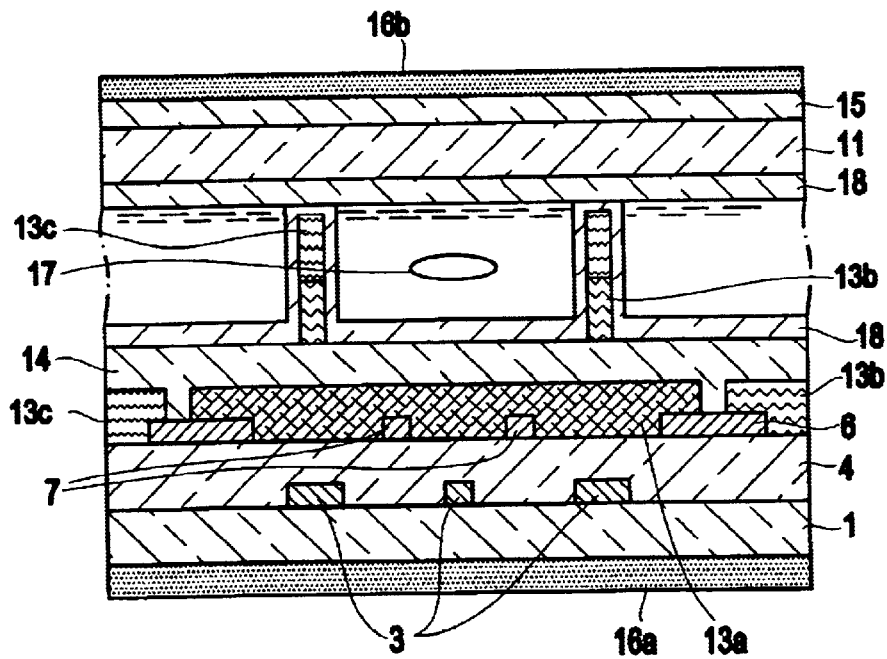
FIG. 24 is a schematic cross sectional view taken along line A–A' of FIG. 23 and showing the structure of the in-plane switching type liquid crystal display unit.

The insulating partition walls 9*b* may be formed from the colored synthetic resin layers on the flattening layer 14 as shown in FIGS. 23 and 24. The color filters 13*a*/13*b*/13*c* are patterned on the inter-layered insulating layer 4, and are covered with the flattening layer 14. The colored synthetic resin layers are laminated on one another for forming the insulating partition walls 9*b*, and the orientation layer 18 is conformably formed thereon. In this instance, although the additional steps are required for the insulating partition walls 9*b*, the manufacturer easily piles up the parts of the walls, and high insulating partition walls 9*b* are easily obtained. The insulating partition walls 9*b* may have the height approximately equal to the gap between the orientation layers. Otherwise, the height is less than the gap so that gap takes place between the orientation layers 18. The insulating partition wall 9*b* may be continuous as similar to the insulating partition wall 29*a*.

Fourth Embodiment

Figure 25:
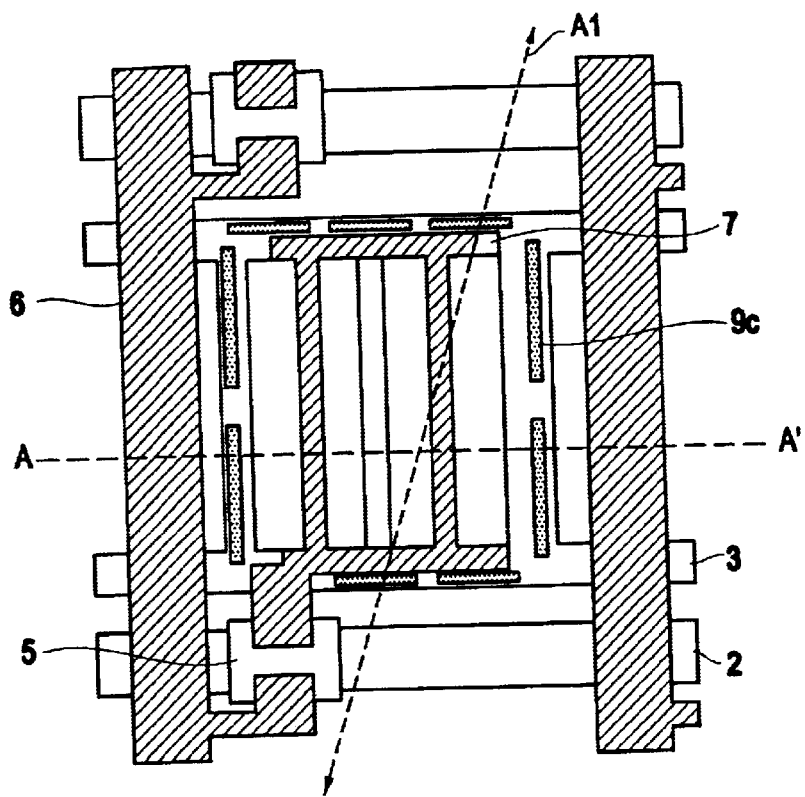
FIG. 25 is a plane view showing the layout of electrodes incorporated in still another in-plane switching type liquid crystal display unit.
Figure 26:
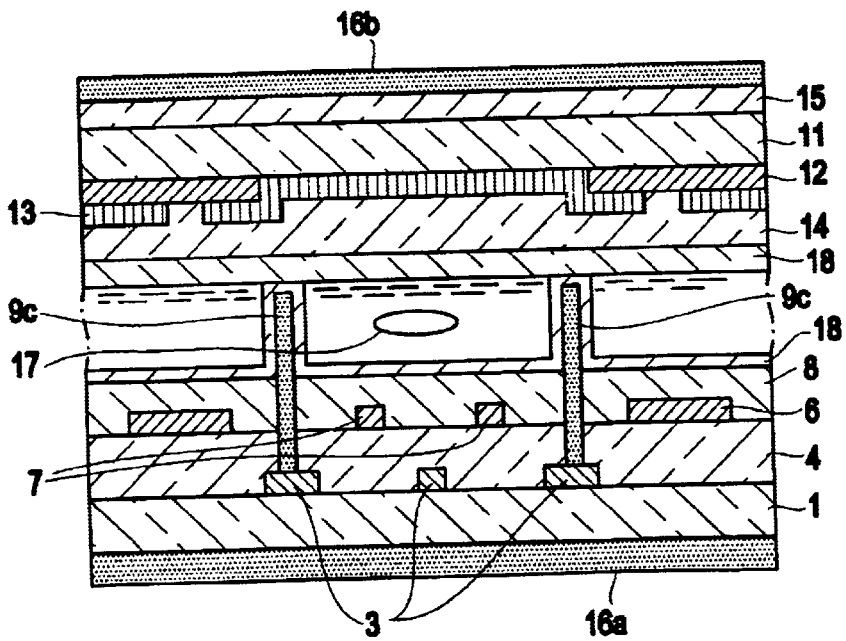
FIG. 26 is a schematic cross sectional view taken along line A–A' of FIG. 25 and showing the structure of the in-plane switching type liquid crystal display unit.

Turning to FIGS. 25 and 26 of the drawings, still another in-plane switching type liquid crystal display unit embodying the present invention largely comprises a first substrate structure, a second substrate structure and liquid crystal filling the gap between the first substrate structure and the second substrate structure. The first substrate structure is assigned to thin film transistors 5, pixel electrodes 7 and other conductive layers, and the second substrate structure is assigned to color filters 13 and a black matrix 12.

The first substrate structure is fabricated on the basis of a transparent substrate 1. Gate electrodes 2 and a common electrode 3 are formed on the transparent substrate 1, and are covered with an inter-layered insulating layer 4. Data lines 6 and a pixel electrode 7 are patterned on the inter-layered insulating layer 4, and are covered with a passivation layer 8. The gate electrodes 2 extend in perpendicular to the data lines 6, and the thin film transistors 5 are assigned to regions where the gate electrodes 2 cross the data lines 6. The thin film transistor 5 has a drain connected to the data line 6, and the pixel electrode 7 is connected to a source electrode of the thin film transistor 5. The gate electrode 2 passes under the channel region of the thin film transistor 5. The pixel electrode 7 is offset from the common electrode 3, and is in parallel to the common electrode 3. The thin film transistor 5 and the pixel electrode 7 are essential parts of the pixel. The data lines 6 and the pixel electrode 7 are hatched in FIG. 25 for discriminating them from other electrodes 2 and 3.

Conductive partition walls 9*c* are upright on the common electrode 3, and project over the passivation layer 8. The conductive partition walls 9*c* separate the zone over the pixel electrode 7 from the zones in the vicinity of the gate electrode 2 and the data line 6. An orientation layer 18 is conformably formed on the passivation layer 8. The exposed surface of the passivation layer 8 and the conductive partition walls 9*c* are converted with the orientation layer 18. A polarizing plate 16*a* is attached to the other surface of the transparent substrate 1. The gap between the gate electrode/data line 2/6 and the common electrode 3 is decreased rather than the first to third embodiments, and the aperture ration is further improved. Moreover, the conductive partition walls 9*c* prevent the pixel from leakage light.

On the other hand, the second substrate structure has a transparent substrate 11, and the black matrix 12 and colored layers 13 are formed on the surface of the transparent substrate 11. The colored layers 13 are colored in red, green and blue, and serve as color filters. One of the three primary color filters is opposed to the pixel electrode 7. The other color filters 13, i.e., the green filter and the blue filter are respectively opposed to other pixel electrodes. The three primary color filters 13, the associated pixel electrodes 7, the associated thin film transistors 5 and part of the liquid crystal 17 therebetween form in combination the pixel. The black matrix 12 and the colored layers 13 are covered with a flattening layer 14, and an orientation layer 18 is formed on the flattening layer 14. The other surface of the transparent substrate 11 is covered with a conductive layer 15, and a polarizing plate 16*b* is attached to the upper surface of the conductive layer 15.

The second substrate structure is spaced from the first substrate structure in such a manner that the orientation layers 18 are opposed to each other, and the liquid crystal 17 fills the gap between the orientation layers 18. The conductive partition walls 9*c* cause the orientation layer 18 to project into the gap so that the orientation layers 18 are held in contact with one another at the conductive partition walls 9*c*. The orientation layers 18 was subjected to a rubbing at a certain angle with respect to the longitudinal direction of the pixel electrode 7, and the liquid crystal 17 has homogenous orientation in a direction indicated by arrow A1.

The polarizing plate 16a has a plane of polarization which is perpendicular to a plane of polarization of the other polarization plate 16b. One of the planes of polarization is in parallel to the orientation of the liquid crystal molecules 17.

Figure 27A:
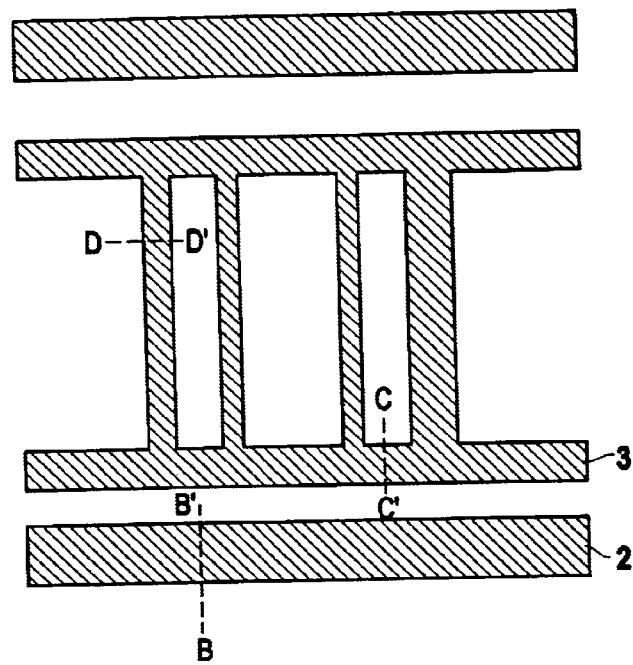
FIG. 27A is a plane view showing the layout of the electrodes in the first step of a process for fabricating the in-plane switching type liquid crystal display unit.
Figure 27B:
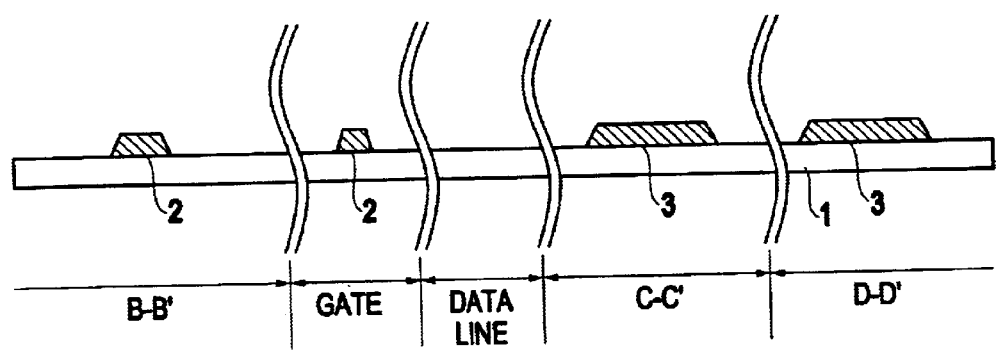
FIG. 27B is a cross sectional view taken along lines B–B', C–C', D–D' and along lines crossing a gate electrode and a data line in the first step.

A process for fabricating the in-plane switching type liquid crystal display unit is described with reference to FIGS. 27A and 27B to FIGS. 32A and 32B. The process starts with preparation of the transparent substrate 1. Conductive metal such as chromium Cr is deposited over the entire surface of the transparent substrate 1 by using a sputtering technique. A photo resist etching mask (not shown) is formed on the chromium layer through the photo lithographic techniques. Using the photo resist etching mask, the chromium layer is selectively removed through a wet etching, and the gate electrodes 2 and the common electrode 3 are formed on the transparent substrate 1. Thus, the chromium layer is patterned through the photo-lithographic techniques and the etching into the gate electrodes 2 and the common electrode 3. The photo resist etching mask is stripped off. The resultant structure is shown in FIGS. 27A and 27B.

Subsequently, silicon oxide is deposited over the entire surface of the resultant structure by using a chemical vapor deposition, and the gate electrodes and the common electrode 3 are covered with the silicon oxide layer 4a. The silicon oxide layer 4a serves as a gate insulating layer of the thin film transistor 5. Silicon nitride, amorphous silicon and heavily-doped n-type amorphous silicon are successively deposited over the silicon oxide layer 4a by using a plasma-assisted chemical vapor deposition, and form a silicon nitride layer 4b, an amorphous silicon layer 5a and a heavily-doped n-type amorphous silicon layer 5b.

Figure 28A:
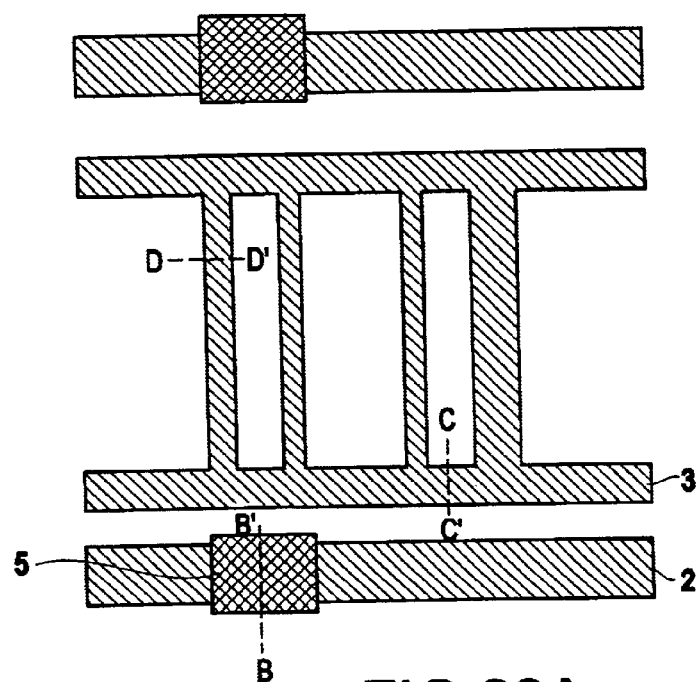
FIG. 28A is a plane view showing the layout of the electrodes in the second step of the process for fabricating the in-plane switching type liquid crystal display unit.
Figure 28B:
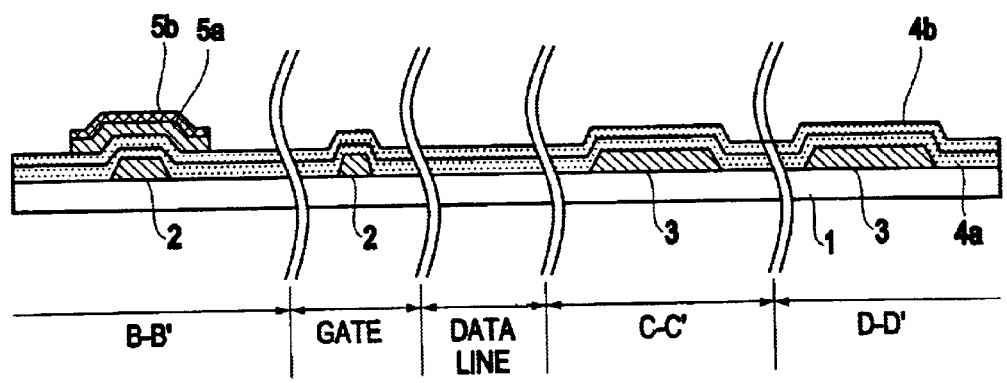
FIG. 28B is a cross sectional view taken along lines B–B', C–C', D–D' and along lines crossing the gate electrode and the data line in the second step.

A photo resist etching mask is formed on the heavily-doped n-type amorphous silicon layer 5b by using the photo-lithographic techniques. Using the photo resist etching mask, the heavily-doped n-type amorphous silicon layer 5b and the amorphous silicon layer 5a are partially etched away by using a dry etching technique. The gate electrode 2 is overlapped with the heavily doped n-type amorphous silicon layer 5b and the amorphous silicon layer 5a, and the heavily doped n-type amorphous silicon layer 5b and the amorphous silicon layer 5a are spread from the region over the gate electrode 2. The photo resist etching mask is stripped off. Thus, the source/drain regions and the channel region are prepared for the thin film transistor 5 in the heavily doped n-type amorphous silicon layer 5b and the amorphous silicon layer 5a as shown in FIGS. 28A and 28B.

Figure 29A:
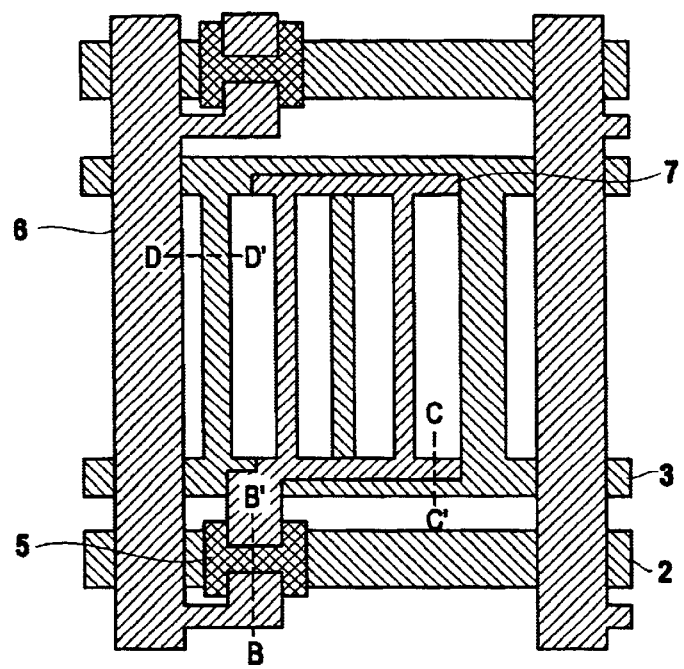
FIG. 29A is a plane view showing the layout of the electrodes in the third step of the process for fabricating the in-plane switching type liquid crystal display unit.
Figure 29B:
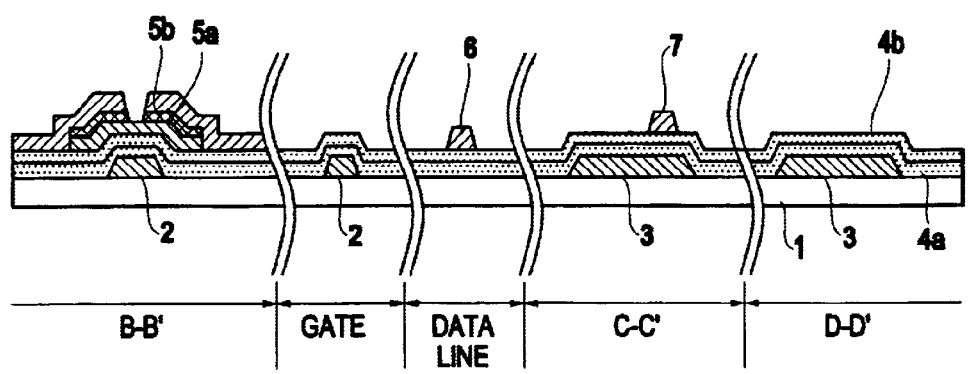
FIG. 29B is a cross sectional view taken along lines B–B', C–C', D–D' and along lines crossing the gate electrode and the data line in the third step.

The chromium is deposited over the entire surface of the resultant structure by using the sputtering technique, and a photo resist etching mask (not shown) is formed on the chromium layer through the photo lithographic techniques. Using the photo resist etching mask, the chromium layer is partially removed by using a wet etching and a dry etching, and the chromium layer is patterned into the data lines 6, source/drain electrodes and the pixel electrode 7. The drain electrode is connected to the associated data line 6, and is held in contact with the drain region. On the other hand, the source electrode is connected to the pixel electrode 7, and is held in contact with the source region. The photo resist etching mask is stripped off. Using the source/drain electrodes as an etching mask, the heavily doped n-type amorphous silicon layer 5b is partially removed by using the dry etching, and the amorphous silicon layer 5a is exposed to the gap between the source electrode and the drain electrode as shown in FIGS. 29A and 29B.

Figure 30A:
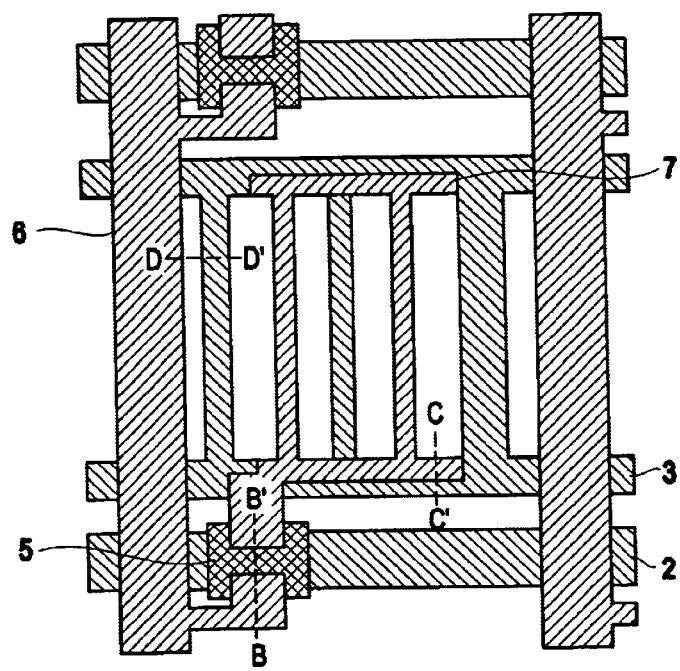
FIG. 30A is a plane view showing the layout of the electrodes in the fourth step of the process for fabricating the in-plane switching type liquid crystal display unit.
Figure 30B:
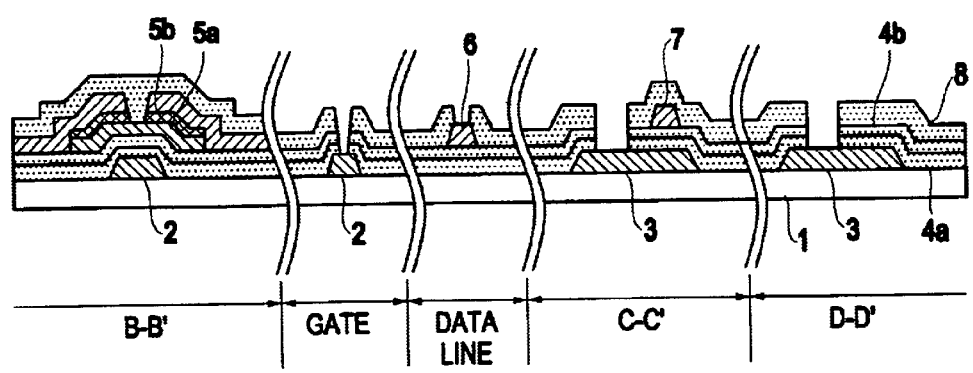
FIG. 30B is a cross sectional view taken along lines B–B', C–C', D–D' and along lines crossing the gate electrode and the data line in the fourth step.

Subsequently, silicon nitride is deposited over the entire surface of the resultant structure by using a plasma-assisted chemical vapor deposition, and forms the passivation layer 8. A photo resist etching mask (not shown) is formed on the passivation layer 8 by using the photo-lithographic techniques for contact holes. Using the photo resist etching mask, the passivation layer 8, the silicon nitride layer 4b and the silicon oxide layer 4a are partially removed through a wet etching and a dry etching for forming contact holes, and the gate electrode 2, the data line 6 and the common electrode 3 are exposed to the contact holes, respectively, as shown in FIGS. 30A and 30B. The photo resist etching mask is stripped off.

Figure 31A:
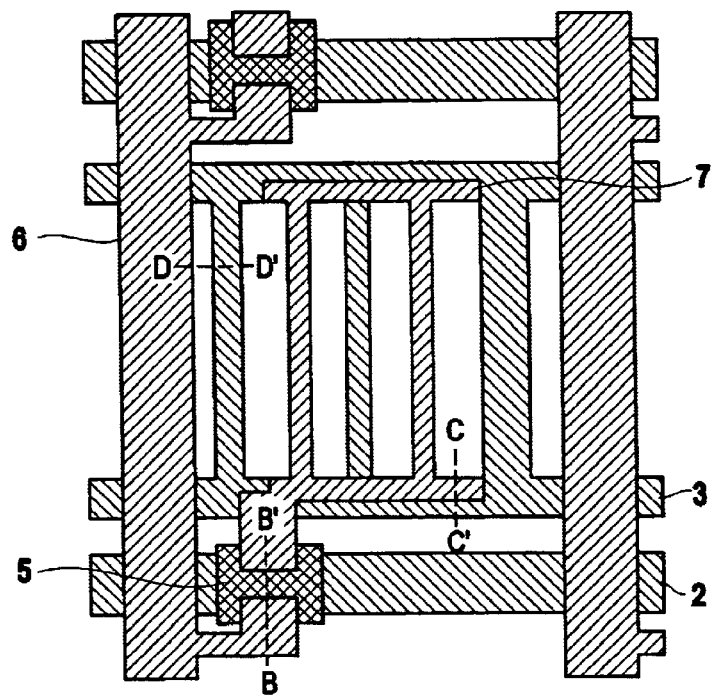
FIG. 31A is a plane view showing the layout of the electrodes in the fifth step of the process for fabricating the in-plane switching type liquid crystal display unit.
Figure 31B:
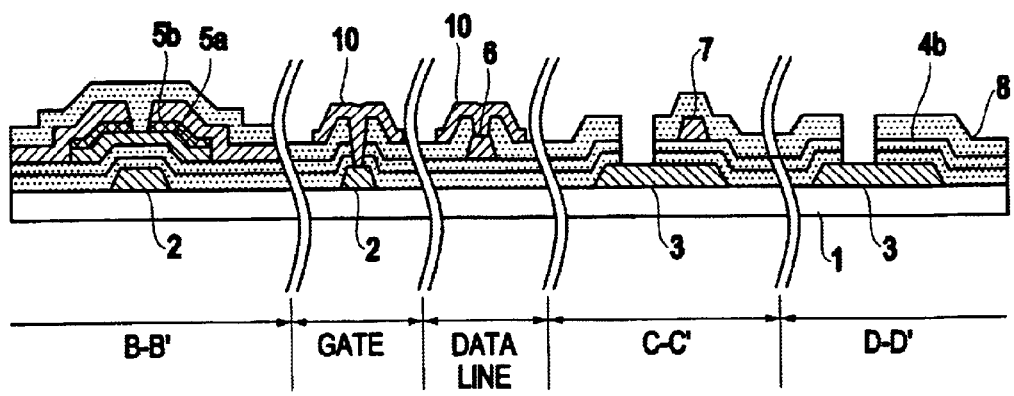
FIG. 31B is a cross sectional view taken along lines B–B', C–C', D–D' and along lines crossing the gate electrode and the data line in the fifth step.

Subsequently, indium tin oxide is deposited over the entire surface of the resultant structure by using a sputtering technique. The indium tin oxide fills the contact holes, and swells into an indium tin oxide layer over the passivation layer 8. A photo resist etching mask (not shown) is formed on the indium tin oxide layer through the photo lithographic techniques. Using the photo resist etching mask, the indium tin oxide layer is partially removed by using a wet etching so as to pattern the indium tin oxide layer into a gate terminal 10 and a drain terminal 10 as shown in FIGS. 31A and 31B. The photo resist etching mask is stripped off, and the resultant structure is annealed under predetermined conditions.

Figure 32A:
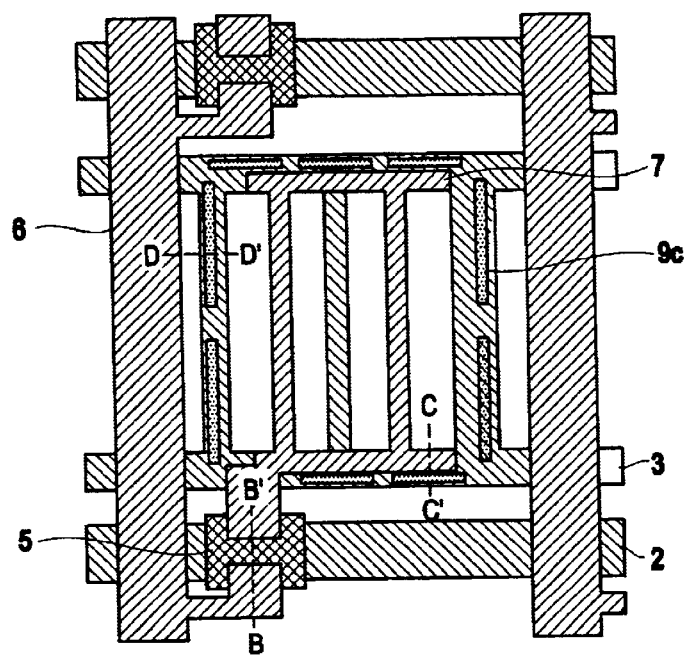
FIG. 32A is a plane view showing the layout of the electrodes in the sixth step of the process for fabricating the in-plane switching type liquid crystal display unit.
Figure 32B:
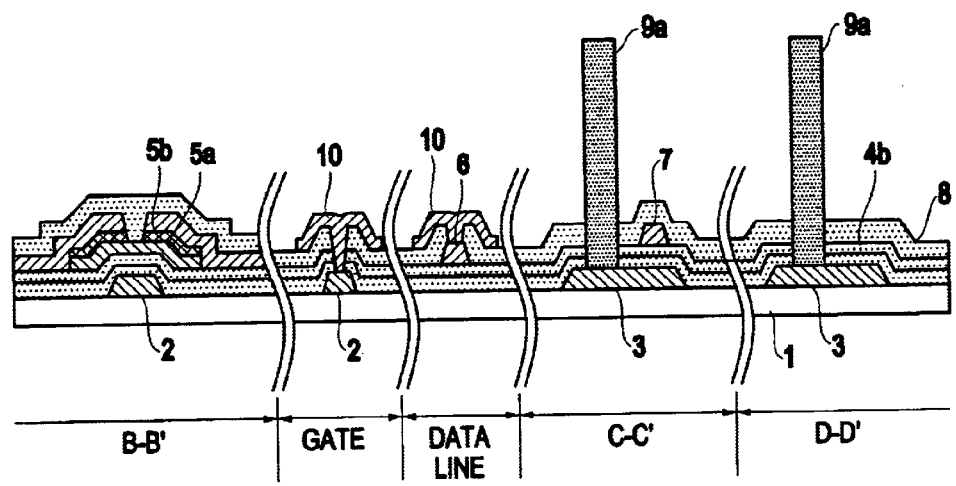
FIG. 32B is a cross sectional view taken along lines B–B', C–C', D–D' and along lines crossing the gate electrode and the data line in the sixth step.

Subsequently, conductive material such as, for example, chromium is deposited to a predetermined thickness over the entire surface of the resultant structure. A photo resist etching mask is prepared through the photo-lithographic techniques on the chromium layer. Using the photo resist etching mask, the chromium is partially etched away for forming the conductive partition walls 9c as shown in FIGS. 32A and 32B.

The second substrate structure is fabricated prior to, posterior to or in parallel to the first substrate structure. The orientation layers 18 are formed on the passivation layer 8 and the insulating partition walls 9a of the first substrate structure and the flattering layer 14 of the second substrate structure, respectively. The first substrate structure is assembled with the second substrate structure, and the liquid crystal is injected into the gap between the first substrate structure and the second substrate structure.

As described hereinbefore, the conductive partition walls 9c of chromium are formed on the common electrode 3, and separates the liquid crystal 17 over the pixel electrode 7 from the liquid crystal 17 in the vicinity of the gate electrode/data line 2/6. Even if the liquid crystal molecules in the vicinity of the gate electrode/data line 2/6 are differently oriented in the presence of the electric field, the conductive partition walls 9c block the liquid crystal molecules 17 over the pixel electrode 7 from the elastic influence of the differently oriented liquid crystal molecules 17, and the liquid crystal molecules 17 are exactly controlled in the electric field due to the potential difference between the pixel electrode 7 and the common electrode 3. Especially, the partition walls 9c are conductive, and are equal in potential level to the common electrode 3. The electric fields outside the conductive partition walls 9c never enter into the zone inside the conductive partition walls 9c. Thus, the liquid crystal molecules 17 over the pixel electrode 7 are promptly changed in orientation.

The present inventor evaluated the in-plane switching type liquid crystal display unit implementing the fourth embodiment. The present inventor fabricated a sample of the in-plane switching type liquid crystal display unit, and measured the transparency in terms of the potential level applied to the pixel electrode 7 and the response time. The experimental data was plotted in FIGS. 15 and 16. White triangles stood for the sample of the in-plane switching type liquid crystal display unit implementing the fourth embodiment.

Comparing the white triangles with the white squares, although the prior art in-plane switching type liquid crystal display unit achieves the maximum transparency around 6 volts, the in-plane switching type liquid crystal display unit implementing the fourth embodiment peaks the transparency around 5 volts. The potential level at the maximum transparency is lower than that of the sample for the first embodiment. Thus, the threshold is decreased. This phenomena is derived from the conductive partition walls 9c which block the liquid crystal molecules 17 over the pixel electrode 7 from the elastic influence and the influence of the external electric fields.

As to the response time, the sample for the fourth embodiment achieves the response time shorter than that of the prior art sample in the whole range. Thus, the conductive partition walls 9c are conducive to the quick response to the image carrying signal.

The in-plane switching type liquid crystal display unit achieves all the advantages of the first embodiment. The conductive partition walls 9c are desirable in in-plane switching type liquid crystal display panel with wide cell gap, and exhibit good performance while the pixel is in black. Although the insulating partition walls 9a/29a/9b can not block the liquid crystal molecules 17 therein from the external electric fields due to the potential difference between the gate electrode/data line 2/6 and the common electrode 3, the conductive partition walls 9c can perfectly shield the liquid crystal molecules therein from the external electric fields. This results in further improving the response time and the view angle characteristics.

The gap between the gate electrode/data line 2/6 and the common electrode 3 is further decreased by virtue of the conductive partition walls 9c. This results in aperture ratio larger than those of the first to third embodiments. The conductive partition walls 9c cooperate with the black matrix, and prevent the pixel from the leakage light.

As will be appreciated from the foregoing description, the in-plane switching type liquid crystal display unit according to the present invention is equipped with partition wall or walls for separating the liquid crystal molecules over the pixel electrode from the liquid crystal molecules outside thereof. The liquid crystal molecules outside the partition walls or walls are under the influence of the electric fields due to the potential differences between the gate electrode/data line and the common electrode, and are oriented differently from those inside the partition walls. However, the partition wall or walls block the liquid crystal molecules inside thereof from the elastic influence of the liquid crystal outside thereof. This results in the large transparency, quick response and the restriction of unintentionally colored periphery of the pixel. This is the first advantage of the present invention.

The second advantage of the present invention is a large aperture ratio and reduction of photo-shield area. The potentials applied to the gate electrode and the data line less influence the liquid crystal inside the partition wall or walls. The distances between the gate electrode/data line and the common electrode are decreased, and the common electrode is narrowed without degradation of the pixel. The narrow common electrode and the short distances decrease the photo-shield area, and, accordingly, increase the aperture ratio.

In case where the conductive partition wall or walls are formed on the constant potential source such as the common electrode, the liquid crystal inside the conductive partition wall or walls is blocked from the electric fields due to the potential differences between the gate electrode/data line and the common electrode. This results in further improvement of the response time and the potential at the maximum transparency. The partition wall or walls on the common electrode prevents the pixel from the leakage light in cooperation with the black matrix.

The in-plane switching type liquid crystal display unit is surely fabricated through the process according to the present invention. In case where the partition wall or walls are formed concurrently with the color filters, any additional step is required, and the process sequence is as simple as that of the prior art.

Although particular embodiments of the present invention have been shown and described, it will be apparent to those skilled in the art that various changes and modifications may be made without departing from the spirit and scope of the present invention.

In the first embodiment, the insulating partition walls 9a are located over the common electrode 3 around the pixel electrode 7. The insulating partition walls 9a are expected to separate the liquid crystal molecules different in orientation from one another. From this viewpoint, the insulating partition walls 9a may be located at different region. For example, the insulating partition walls 9a may be located at the region between the gate electrode/data line 2/6 and the common electrode 3. Otherwise, the insulating partition walls 9a may be formed in a region within the pixel.

The insulating partition walls 9a may be incorporated in the second substrate structure.

The present invention may be applied to a liquid crystal display unit with multi-domain pixels. The multi-domain pixel includes plural domains in the pixel, and the liquid crystal molecules in the multi-domains are differently oriented. In this instance, the insulating partition walls are formed within the pixel so as to separate the liquid crystal molecules in the multi-domains from one another. The insulating partition walls 9a makes the orientation of the liquid crystal independently controlled.

The partition walls 9b may be conductive. A continuous conductive partition wall may be formed on the common electrode. The conductive partition walls 9c may be formed of other conductive material such as, for example, titanium, tungsten or indium-tin-oxide. The conductive partition wall may not be connected to the common electrode 3, and may be incorporated in the second substrate structure.

What is claimed is:

1. An in-plane switching type liquid crystal display panel for producing images, comprising:
   a pair of substrate structures opposed to each other and defining a gap therebetween;
   a liquid crystal filling said gap, and serving as optical elements of plural pixels where said images are produced, wherein each of said plural pixels comprises:
   a common electrode formed in one of the substrate structures of said pair,
   a pixel electrode formed in said one of said substrate structures in an offset manner to said common electrode, and defining a zone in said liquid crystal together with said common electrode for accommodating one of said optical elements of said plural pixels therein, and
   a switching transistor formed in said one of said substrate structures and having a source connected to said pixel electrode, a data line extending outside of a periphery of said zone and a gate electrode extending outside of said periphery; and at least one partition wall structure associated with each of said plural pixels, formed in any one of said substrate structures, so that said at least one partition wall structure separates the liquid crystal between said common electrodes and said pixel electrodes from the liquid crystal between one of said data line and said common electrode formed along said data line and the liquid crystal between said gate electrode and said common electrode.

2. The in-plane switching type liquid crystal display panel as set forth in claim 1, in which said at least one partition wall structure is overlapped with said common electrode.

3. The in-plane switching type liquid crystal display panel as set forth in claim 1, in which said at least one partition wall structure comprises plural walls spaced from one another for forming gaps thereamong.

4. The in-plane switching type liquid crystal display panel as set forth in claim 1, in which said at least one partition wall structure comprises a single wall encircling said part of said one of said optical elements therein.

5. The in-plane switching type liquid crystal display panel as set forth in claim 1, in which said at least one partition wall structure causes said substrate structures to be partially held in contact with one another.

6. The in-plane switching type liquid crystal display panel as set forth in claim 1, in which said at least one partition wall structure comprises insulating material.

7. The in-plane switching type liquid crystal display panel as set forth in claim 1, in which said at least one partition wall structure comprises conductive material.

8. The in-plane switching type liquid crystal display panel as set forth in claim 7, in which said at least one partition wall structure is connected to a source of voltage.

9. The in-plane switching type liquid crystal display panel as set forth in claim 8, in which said source of voltage comprises said common electrode.

10. The in-plane switching type liquid crystal display panel as set forth in claim 1, further comprising at least one set of color filters formed in any one of said substrate structures, each color filter in each set being different in color and associated with one of said plural pixels, wherein one of the color filters of said set is overlapped with said one of said optical elements.

11. The in-plane switching type liquid crystal display panel as set forth in claim 10, in which said any one of said substrate structures is identical to said one of said substrate structures, and wherein said at least one partition wall structure is formed on said at least one of said color filters.

12. The in-plane switching type liquid crystal display panel as set forth in claim 11, in which said color filters comprise the same material as said at least one partition wall structure.

13. A process for fabricating in-plane switching type liquid crystal display unit of claim 1, comprising:
   a) preparing substrate structures one of which comprises:
       at least one partition wall structure occupying an area partially overlapped with a pixel electrode forming a part of one of plural pixels and formed on a common electrode associated with said pixel electrode, and
       a switching transistor located out of said area and connected with said pixel electrodes, and
       a data line connected to said switching transistor;
   b) assembling said substrate structures in such a manner as to form a gap therebetween; and
   c) introducing liquid crystal into said gap so that part of said liquid crystal fills a zone defined by a periphery of said at least one partition wall structure.

14. The process as set forth in claim 13, wherein the preparing of one of said substrate structures comprises:
   a-1) preparing a transparent substrate,
   a-2) forming a gate electrode of said switching transistor and said common electrode on said transparent substrate,
   a-3) covering said gate electrode and said common electrode with a first insulating layer,
   a-4) forming said data line and said pixel electrode on said first insulating layer in such a manner that said switching transistor is connected to said data line and said pixel electrode,
   a-5) completing said switching transistor including said gate electrode on said first insulating layer,
   a-6) covering said data line, said pixel electrode and said switching transistor with a second insulating layer, and
   a-7) forming said at least one partition wall structure on said second insulating layer.

15. The process as set forth in claim 13, in which said at least one partition wall structure has walls spaced from one another.

16. The process as set forth in claim 13, in which said at least one partition wall structure has a single wall formed along a periphery of said area.

17. The process as set forth in claim 13, in which said at least one partition wall structure has a height approximately equal to a distance between said substrate structures.

18. The process as set forth in claim 13, wherein the preparing of one of said substrate structures comprises:
   a-1) preparing a transparent substrate,
   a-2) forming a gate electrode, said common electrode, said data line, another data line and said pixel electrode over said transparent substrate,
   a-3) forming a first color filter in such a manner that said pixel electrode and a part of said data line and said another data line are covered with said first color filter,
   a-4) forming a lower part of said at least one partition wall structure on said first color filter concurrently with a second color filter different in color from said first color filter and extending over another pixel electrode and associated data lines, and
   a-5) forming a higher part of said at least one partition wall structure on said lower part concurrently with a third color filter different in color from said first and second color filters and extending over yet another pixel electrode and associated data lines.

19. The process as set forth in claim 13, wherein preparing of in which one of said substrate structures comprises: is fabricated through the sub-steps of
   a-1) preparing a transparent substrate,
   a-2) forming a gate electrode and said common electrode on said transparent substrate,
   a-3) covering said gate electrode and said common electrode with a first insulating layer,
   a-4) forming said data line and said pixel electrode on said first insulating layer,
   a-5) forming contact holes for exposing a part of said gate electrode, a part of said data line and a part of said common electrode thereto,
   a-6) forming conductive terminals held in contact with said part of said gate electrode and said part of said data line, and
   a-7) forming said at least one partition wall structure held in contact with said part of said common electrode.

20. An in-plane switching type liquid crystal display panel having a plurality of pixel areas, the panel comprising:

liquid crystals between a pair of substrate structures and comprising optical elements within each of said plurality of pixel areas;

a common electrode on one of said substrate structures for each pixel area;

a pixel electrode for each pixel area offset from said common electrode on said one of said substrate structures, wherein said common electrode and said pixel electrode define said pixel area;

a switching transistor on said one of said substrate structures and having a source connected to said pixel electrode, a data line extending outside a periphery of said pixel area and a gate electrode extending outside of said periphery; and a partition wall structure formed on said common electrode of at least one of said pixel areas for separating said optical elements from the remaining liquid crystal.

21. The panel of claim 20, wherein said partition wall structure is provided on said common electrode adjacent said gate electrode.

22. The panel of claim 20, wherein said partition wall structure is provided on said common electrode adjacent said data line.

* * * * *